United States Patent [19]

Pryor, Jr.

[11] Patent Number: 5,408,598
[45] Date of Patent: Apr. 18, 1995

[54] METHOD FOR FAST GENERATION OF PARAMETRIC CURVES EMPLOYING A PRE-CALCULATED NUMBER OF LINE SEGMENTS IN ACCORDANCE WITH A DETERMINED ERROR THRESHOLD

[75] Inventor: Duaine W. Pryor, Jr., Berkeley, Calif.

[73] Assignee: International Business Machines Corporation, Armonk, N.Y.

[21] Appl. No.: 202,678

[22] Filed: Feb. 25, 1994

Related U.S. Application Data

[63] Continuation of Ser. No. 705,041, May 23, 1991, abandoned.

[51] Int. Cl.⁶ ............................................. G06T 11/00
[52] U.S. Cl. ...................................... 395/142; 395/143
[58] Field of Search ................................. 395/141–143, 395/119, 123, 127, 133, –140, 155, 150, 151

[56] References Cited

U.S. PATENT DOCUMENTS

| | | | |
|---|---|---|---|
| 3,806,713 | 4/1974 | Ryberg | 235/151.11 |
| 4,648,024 | 3/1987 | Kato et al. | 364/169 |
| 4,654,805 | 3/1987 | Shoup, II | 364/520 |
| 4,674,058 | 6/1987 | Lindbloom et al. | 364/518 |
| 4,760,548 | 7/1988 | Baker et al. | 364/718 |
| 4,855,935 | 8/1989 | Lien et al. | 364/521 |
| 4,907,282 | 3/1990 | Daly et al. | 382/9 |
| 4,912,659 | 3/1990 | Liang | 364/521 |
| 4,912,664 | 3/1990 | Weiss et al. | 395/123 X |
| 4,943,935 | 7/1990 | Sate | 364/518 |
| 4,949,281 | 8/1990 | Hillenbrand et al. | 364/518 |
| 4,999,789 | 3/1991 | Fiasconaro | 395/127 |
| 5,133,052 | 7/1992 | Bier et al. | 395/133 X |
| 5,214,754 | 5/1993 | Okamoto et al. | 395/142 |

OTHER PUBLICATIONS

Computer Science Press, Inc., "Algorithms for Graphics and Image Processing", Theo Pavlidis Bell Laboratories, pp. 221–231., 1982.

I. D. Faux et al., "Computational Geometry for Design and Manufacture", Dept. of Mathematics 1979, pp. 127–145. Publisher: E. Horwood Ltd.

Wolfgang Dahmen, "Subdivision Algorithms Converge Quadratically", 1988, pp. 145–158, Journal of Computational and Applied Mathimatics.

*Primary Examiner*—Almis R. Jankus
*Attorney, Agent, or Firm*—Perman & Green

[57] ABSTRACT

A method enables the prediction of the number of subdivisions of a curve that will be required by control polygons to assure that a resulting straight line representation of the curve will not exceed a preset error threshold. The method is applicable to cubics and parametric quadratics including parabolas, ellipses and hyperbolas. In each case, the prediction of the number of subdivisions eliminates the need for a detailed error calculation at each subdivision step, thereby enabling an error calculation to be carried out only once in the process.

14 Claims, 9 Drawing Sheets

BEZIER SECOND ORDER CURVE (PARABOLA)

METHOD FOR FAST GENERATION OF PARAMETRIC CURVES EMPLOYING A PRE-CALCULATED NUMBER OF LINE SEGMENTS IN ACCORDANCE WITH A DETERMINED ERROR THRESHOLD

This is a continuation of application Ser. No. 07/705,041, filed on May 23, 1991, now abandoned.

FIELD OF THE INVENTION

This invention relates to computer graphics, and more precisely, to a method and apparatus for rapidly generating curves on a computer display.

BACKGROUND OF THE INVENTION

Computer graphics employ a number of techniques to reproduce curved lines and surfaces. One commonly used technique involves producing a set of points and connecting those points with straight lines to approximate the curve. The curve is successively divided into smaller pieces and then checked to see if each piece can be approximated by a straight line to within a given error threshold. It turns out that the check of the accuracy of the approximation is the dominant part of the cost of executing the curve approximation algorithm.

In a two-dimensional space, a curve is often expressed as a function of orthogonal components x and y, i.e., y is equal to f(x). In a three-dimensional coordinate system, the x, y and z coordinates may also be represented as functions of one or two of the orthogonal components. However, these representations may cause difficulty in generating the coordinate values. One alternative technique is to use a parametric representation of the curve or a representation where each coordinate value on a curve is represented as a function of some common variable, that is, a variable common to all coordinate components. For a three dimensional system, such a variable may be described as t resulting in the following: x=f(t); y=g(t); and z=h(t); for 0<t<1. A further representation is a parametric cubic curve that is represented by third order polynomials.

$$x = f(t) = a_x t^3 + b_x t^2 + c_x t + d_x$$

$$y = g(t) = a_y t^3 + b_y t^2 + c_y t + d_y$$

$$z = h(t) = a_x t^3 + b_y t^2 + c_z t + d_z$$

Cubic curves are important because no lower-order representation of curve segments can provide either continuity of position and slope or continuity of slope and curvature at the point where the curve segments meet. Cubic curves are also the lowest order curves that can render non-planar curves in three dimensions.

A popular prior art method for subdividing parametric cubic curves is termed "Bezier subdivision". The Bezier subdivision method will be briefly described, but no explanation or proof of its correctness will be given. Such proofs may be found in various texts on graphics, i.e., see "Fundamentals of Interactive Computer Graphic, Foley et al., Addison-Wesley Publishing Co., pp. 514–523; "Algorithms for Graphics and Image Processing", Pavlidis, Computer Science Press, pp. 220–231; and "Computational Geometry For Design and Manufacture", Faux et al., Wiley and Sons, pp. 126–145.

Given a curve and an error threshold $\Delta_E$, the Bezier algorithm produces a list of line segments which approximate the curve with errors no larger than $\Delta_E$. The curve itself is described by a control polygon consisting of 4 points, p1, p2, p3, p4. Such a control polygon is shown in FIG. 1 and which also includes cubic curve 10 is being approximated. The dimension E is the error and defines the distance between the chord p1–p4 and the apogee of curve 10. If E is greater than $\Delta_E$ two more polygons are constructed from the original polygon, with the property that curve 10 lies within each new polygon, and that each new polygon is the control polygon for the part of the curve which it contains. This subdivision proceeds recursively.

An iteration of this subdivision process has three stages. The first stage is indicated in FIG. 2 wherein the following values are found:

$$l1 = p1$$

$$l2 = \frac{p1 + p2}{2}$$

$$mid = \frac{p2 + p3}{2}$$

$$r4 = p4$$

$$r3 = \frac{p4 + p3}{2}$$

The second stage of the calculation is shown in FIG. 3 and shows the derivation of points l3 and r2 as follows:

$$l3 = \frac{l2 + mid}{2}$$

$$r2 = \frac{r3 + mid}{2}$$

The third stage involves the derivation of points l4 and r1 as follows:

$$l4 = \frac{l3 + r2}{2}$$

$$r1 = l4$$

At the end of the above iterations, the derived values are:

$$l1 = p1$$

$$l2 = \frac{p1 + p2}{2}$$

$$l3 = \frac{p1}{4} + \frac{p2}{2} + \frac{p3}{4}$$

$$l4 = \frac{p1}{8} + \frac{3 * p2}{8} + \frac{3 * p3}{8} + \frac{p4}{8}$$

$$r1 = l4$$

$$r3 = \frac{p4}{4} + \frac{p3}{2} + \frac{p2}{4}$$

$$r2 = \frac{p3 + p4}{2}$$

$$r4 = p4$$

As can be seen from FIG. 4, the Bezier control polygons l1–l4 and r1–r4 now better approximate curve 10. For any given resolution $\Delta_E$, the subdivision process ends when, any curve within a polygon is at most a distance $\Delta_E$ from the base line of that polygon. (The base line of the polygon is the line connecting P1 to P4). The calculation may be simplified by calculating the value for d instead of $\Delta_E$ (see FIG. 1).

In essence, Bezier subdivision generates a binary tree where each node of the tree corresponds to a subdivision step, and each edge of the tree descending from a node corresponds to a right or left control polygon that is the result of a subdivision at that node. In a simple implementation, the calculation cost for each node includes approximately 12 additions and 12 shifts (24 cycles). However, the error check for $\Delta_E$ requires at least 350 additional cycles. Thus, most of the computational work (88%) is in computing the error condition $\Delta_E$ at the end of each iteration. Similar disparities in calculation work exist for more complex equations, i.e., parametric quadratics, conics, etc.

PRIOR ART SUBDIVISION ALGORITHM FOR PARAMETRIC QUADRATICS

Bezier subdivision algorithms such as the one presented for Bezier cubics exist for Bezier curves of all orders. In particular, subdivision of parametric quadratics will now be described. A parametric quadratic is a parametric curve whose coordinate functions are second order polynomials in the parameter t.

The parametric curve is described by a triangular control polygon (see FIG. 5) consisting of three points, $p_0$, $p_1$, $p_2$. These points define the curve as follows:

$$(x(t),y(t)) = p_0(1-t)^2 + 2p_1 t(1-t) + p_2 t^2$$

$0 < t < 1$

From this polygon, two more polygons are constructed with the property that half of the curve lies within each new polygon and that each new polygon is the control polygon for the part of the curve which it contains. Thus the subdivision may proceed recursively. An iteration of this subdivision process has two stages as follows:

$$l_0 = p_0$$

$$l_1 = \frac{p_0 + p_1}{2}$$

$$r_1 = \frac{p_1 + p_2}{2}$$

$$r_2 = p_2$$

The second stage:

$$l_2 = \frac{l_1 + r_1}{2}$$

$$r_0 = l_2$$

At the end of such an iteration, the values are:

$$l_0 = p_0$$

$$l_1 = \frac{p_0 + p_1}{2}$$

$$l_2 = \frac{p_0}{4} + \frac{p_1}{2} + \frac{p_2}{4}$$

$$r_0 = l_2$$

-continued $$r_1 = \frac{p_1 + p_2}{2}$$

$$r_2 = p_2$$

The notation r(p)(t) will be used to denote the curve determined by $r_i$ and l(p)(t) to denote the curve determined by $l_i$. The algorithm continues recursively with each of the two output polygons being subdivided. Just as with subdivision for cubics, the subdivision process ends when the curve within the polygon is sufficiently close to the polygon, e.g., a distance less than some threshold T away. Again, if d is the function which gives the distance from a point to a line, and l(p,q) represents the line which connects p to q, $d(p_1, l(p_0, p_2)) \leq T$ where, $$d(p_1, l(p_0, p_2)) = \frac{|(p_1 - p_0) \bullet (\widehat{p_2 - p_0})|}{\sqrt{(p_2 - p_0) \bullet (p_2 - p_0)}} \leq T$$

where • is the 2-D dot product and the hat of a vector is a vector of the same length as that vector but perpendicular to it.

PRIOR ART SUBDIVISION ALGORITHM FOR PARAMETRIC RATIONAL QUADRATICS

In this section, a prior art algorithm for drawing rational quadratics is described. It is based on using the subdivision algorithm described above to subdivide both the numerator and denominator of a rational quadratic. The control points of the subdivided numerator and denominator are divided to give the endpoints of a linear approximation to the curve.

Assume the following rational quadratic curve (x(t),y(t)) in a plane. The forms of the coordinate functions are given by:

$$x(t) = \frac{x_0 w_0 (1-t)^2 + 2x_1 w_1 t(1-t) + x_2 w_2 t^2}{w_0 (1-t)^2 + 2w_1 t(1-t) + w_2 t^2}$$

$$y(t) = \frac{y_0 w_0 (1-t)^2 + 2y_1 w_1 t(1-t) + y_2 w_2 t^2}{w_0 (1-t)^2 + 2w_1 t(1-t) + w_2 t^2}$$

Note that the numerator is expressed in the quadratic Bezier basis, as is the denominator. Henceforth, $w_i$ is required to be positive since this can be done without losing the ability to represent all rational quadratics. Geometrically, $(x_i, y_i)$ are control points and $w_i$ is the weight attached to these control points. The following quantities are defined, $X_i = x_i w_i$ and $Y_i = y_i w_i$. These are the coordinates in the Bezier basis of the numerator, (X(t), Y(t)).

In order to draw such a curve, Bezier subdivision is applied to both the $X_i, Y_i$ and the $w_i$ to generate l(X), l(Y), l(w) and r(X), r(Y) and r(w) as in the previous section. Let s(a) denote r(a) or l(a) (i.e., "a" subdivided once). By evaluating the resultant fraction $(s(X)_i, s(Y)_i/s(w)_i$, the control points of the resultant curves are obtained. The weights of the resultant curves are the $s(w)_i$.

This is equivalent to the application of Bezier subdivision to the 3-d, second order curve (Z(t),Y(t),w(t)) followed by a perspective projection onto the x,y plane (see FIG. 6). The ending condition of the previous subsection is then applied to the curve in the x,y plane. If the subdivision is not finished, the 3-d curve is further subdivided and again projected. This continues recursively.

PRIOR ART INCREMENTAL ALGORITHMS

An Incremental Algorithms For Cubics

There are several incremental schemes for evaluating cubics. Assume a cubic curve that is specified by its two coordinate functions, $$x(t) = x_0 + x_1 t + x_2 t^2 + x_3 t^3$$

$$y(t) = y_0 + y_1 t + y_2 t^2 + y_3 t^3$$

Suppose the values of the coordinate functions are known for some $t_0$ and it is desired to know them for some other value $t_0 + \Delta t$. Define $$x_t(t_0) = x(t_0 + \Delta t) - x(t_0)$$

$$x_{tt}(t_0) = x_t(t_0 + \Delta t) - x_t(t_0)$$

$$x_{ttt}(t_0) = x_{tt}(t_0 + \Delta t) - x_{tt}(t_0)$$

$$y_t(t_0) = y(t_0 + \Delta t) - y(t_0)$$

$$y_{tt}(t_0) = y_t(t_0 + \Delta t) - y_t(t_0)$$

$$y_{ttt}(t+0) = y_{tt}(t_0 + \Delta t) - y_{tt}(t_0)$$

By rewriting the above quantities in terms of the derivatives of x and y, it can be seen that $x_{ttt}$ and $y_{ttt}$ are constant with respect to t. Now, to get $x(t+\Delta t)$ add $x(t) + x_t(t)$. To continue in this fashion, compute $x_t(t+\Delta t)$ in order to make the next step forward by $\Delta t$. Similarly, $x_{tt}$ must be updated. This leads to the following algorithm for generating points of the curve.

- choose $\Delta t = \frac{1}{n}$ for some $n$

- compute $x(0)$, $x_t(0)$, $x_{tt}(0)$, $x_{ttt}(0)$

- compute $y(0)$, $y_t(0)$, $y_{tt}(0)$, $y_{ttt}(0)$

- for $\left( t = \frac{1}{n} \text{ to } 1 \text{ by } \frac{1}{n} \right)$ $$x(t) = x\left(t - \frac{1}{n}\right) + x_t\left(t - \frac{1}{n}\right)$$

$$x_t(t) = x_t\left(t - \frac{1}{n}\right) + x_{tt}\left(t - \frac{1}{n}\right)$$

$$x_{tt}(t) = x_{tt}\left(t - \frac{1}{n}\right) + x_{ttt}\left(t - \frac{1}{n}\right)$$

$$y(t) = y\left(t - \frac{1}{n}\right) + y_t\left(t - \frac{1}{n}\right)$$

$$y_t(t) = y_t\left(t - \frac{1}{n}\right) + y_{tt}\left(t - \frac{1}{n}\right)$$

$$y_{tt}(t) = y_{tt}\left(t - \frac{1}{n}\right) + y_{ttt}\left(t - \frac{1}{n}\right)$$

An Incremental Algorithm for Conics

Assume a parametric quadratic coordinate function $$y(t) = y_0 + y_1 t + y_2 t^2$$

Suppose the values of the coordinate function for some $t_0$ are known and it is desired to know them for some other value $t_0 + \Delta t$.

$$y_t(t_0) = y(t_0 + \Delta t) - y(t_0)$$

$$y_{tt}(t_0) = y_t(t_0 + \Delta t) - y_t(t_0)$$

By rewriting the above quantities in terms of the derivatives of y it can be seen that $y_{tt}$ is constant with respect to t. Now, to get $y(t+\Delta t)$ simply add $y(t) + y_1(t)$, continue in this fashion and compute $y_t(t+\Delta t)$ in order to make the next step forward by $\Delta t$. This leads to the following algorithm for generating coordinates.

- choose $\Delta t = \frac{1}{n}$ for some $n$

- compute $y(0)$, $y_t(0)$, $y_{tt}(0)$, $x(0)$, $x_t(0)$, $x_{tt}(0)$

- for $\left( t = \frac{1}{n} \text{ to } 1 \text{ by } \frac{1}{n} \right)$ $$y(t) = y\left(t - \frac{1}{n}\right) + y_t\left(t - \frac{1}{n}\right)$$

$$y_t(t) = y_t\left(t - \frac{1}{n}\right) + y_{tt}\left(t - \frac{1}{n}\right)$$

$$x(t) = x\left(t - \frac{1}{n}\right) + x_t\left(t - \frac{1}{n}\right)$$

$$x_t(t) = x_t\left(t - \frac{1}{n}\right) + x_{tt}\left(t - \frac{1}{n}\right)$$

This may be extended to an algorithm for rational quadratics in the same way the subdivision algorithm was. Namely, the above algorithm which works for a coordinate function is applied to the numerator, (X(t), Y(t)) and the denominator, w(t), and then divide to get the result.

Both prior art incremental algorithms suffer from similar problems which will be explained using cubics as an example. The incremental algorithm is more efficient than subdivision, but is also numerically ill-conditioned in the sense that errors in $y_{ttt}$ grow cubically with the number of steps taken. That problem can be skirted, to some extent, by calculating $y_{ttt}$ to high precision, however, precision grows cubically with the number of steps. The proper choice of value for $\Delta t$ is a more difficult problem. One approach to solving this problem is adaptive subdivision which varies the size of $\Delta t$ based upon the distance moved in the last step. This makes the function more expensive and more complicated.

While the Bezier subdivision technique has been described above, other derivations employ the Hermite form and the B-spline form, which forms are also considered in the above cited texts. In U.S. Pat. Nos. 4,760,548 to Baker et al, 4,912,659 to Liang 4,949,281 to Hilenbrand et al. and 4,907,282 to Daly, various aspects of B-spline curve approximation techniques are described. In U.S. Pat. Nos. 4,674,058 to Lindbloom et al. and 4,943,935 to Sato, Bezier calculations are described for curve approximation. All of the aforedescribed patents either precalculate the curve approximations and then store the results for subsequent display or calculate error values as the curves are being constructed.

In U.S. Pat. 4,855,935 to Lein, the problems inherent in recursive subdivision methods are recognized and it is suggested that a technique called "forward differencing" (advancing along a parametric curve or surface in constant parameter increments) be utilized to more efficiently generate the curve. This adaptation is performed by transforming the equation of the curve to an identical curve with different parameterization, such that the step sizes increase or decrease so that the curve proceeds in substantially uniform increments.

In U.S. Pat. No. 4,648,024 to Kato et al., curved lines (circles) instead of straight lines are employed at the lowest level of approximation for the algorithm. Other prior art concerns itself with the construction of curves that can be parameterized by arc length, i.e., a curve whose points, at equally stepped times t, are separated by a constant function or distance along the curve, (e.g. a circle). Such a system is shown in U.S. Pat. No. 4,654,805 to Shoup, II.

In U.S. Pat. No. 3,806,713 to Ryberg, a curve approximation system is described for curves having a rotational axis. Ryberg's system is based on an error in approximation of a circle by a line. Ryberg does not attempt to overcome the error calculation problem mentioned above by determining, in advance, the number of straight line segments that will be required to approximate the curve. The length of each straight line approximation is expressed by Ryberg in terms of the number of steps along the rotational axis of the curve, for each straight line approximation. That value is determined by multiplying the total number of steps to be taken along the rotational axis times a function that results from dividing a predetermined maximum error in the number of steps to be taken along a radial axis, by the total number of steps to be taken along the radial axis for a given curve. While Ryberg's procedure is useful for curves that can be parameterized by arc length, he does not teach any method for more complex curves that do not lend themselves to such parameterization.

Recently, it has been proved by Dahmen that subdivision algorithms used to reproduce curves converge in a quadratic fashion. In specific Dahmen found that the class of subdivision algorithms that includes Bezier subdivision, converges quadratically. This is equivalent to the statement that at some indeterminate point in the subdivision algorithm, the error E began to reduce in size by a factor of approximately 4 at each division step. See "Subdivision Algorithms Converge Quadratically", Dahmen, Journal of Computational and Applied Mathematics, Vol. 16, 1986, pp. 145-158. While Dahmen's results indicate that widely used subdivision algorithms do have a convergency, he does not indicate at which stage that convergency occurs and at which point in the subdivision process the error begins to be divided by a factor of 4.

Accordingly, it is an object of this invention to provide an improved method for approximating a curve through the use of straight lines, and to reduce the number of error calculations.

It is another object of this invention to provide an improved curve approximation algorithm which is particularly applicable to cubics, conics, quadratics, and other high order curvilinear equations.

SUMMARY OF THE INVENTION

A method is described which enables the prediction of the number of subdivisions of a curve that will be required by control polygons to assure that a resulting straight line representation of the curve will not exceed a preset error threshold. The method is applicable to cubics and parametric quadratics including parabolas, ellipses and hyperbolas. In each case, the prediction of the number of subdivisions eliminates the need for a detailed error calculation at each subdivision step, thereby enabling an error calculation to be carried out only once in the process.

DETAILED DESCRIPTION OF THE INVENTION

As indicated in the Background of the Invention, in the process of subdividing a curve into smaller segments and checking to see if each segment can be approximated by a line to within a given threshold, substantial computation time is taken up at each subdivision by the calculation of an error function. When it is realized that each subdivision creates a tree wherein the next level of subdivision doubles the number of control polygons, it can be seen that error calculations greatly hinder the curve approximation procedure. As further indicated in the Background, Dahmen has determined, theoretically, that at some point in the subdivision procedure the error decreases by a factor of four at each subsequent subdivision.

It has been found, for a curve which can be expressed as a cubic, that the reduction in error by four occurs generally after the second subdivision. Also, the largest contribution to the error function occurs as a result of attempting to simulate a complex curve with a straight line, and arises from the fact that a straight line cannot approximate the second derivative of the curve. It has been further determined that the number of subdivisions of control polygons to simulate a curve within a certain error tolerance can be predicted by carrying out an initial error computation and then dividing the found error by a factor (e.g. the value 4) an integer number of times until the resultant error is less than a predetermined value. The number of times the error function is divided is then equal to the number of subdivisions that need to be accomplished. As a result, the required number of subdivisions is then known. This allows the required number of control polygons to be constructed, and thus gives the starting and end points of the straight lines to simulate the curve. No further error function calculations are required.

Figure 7:
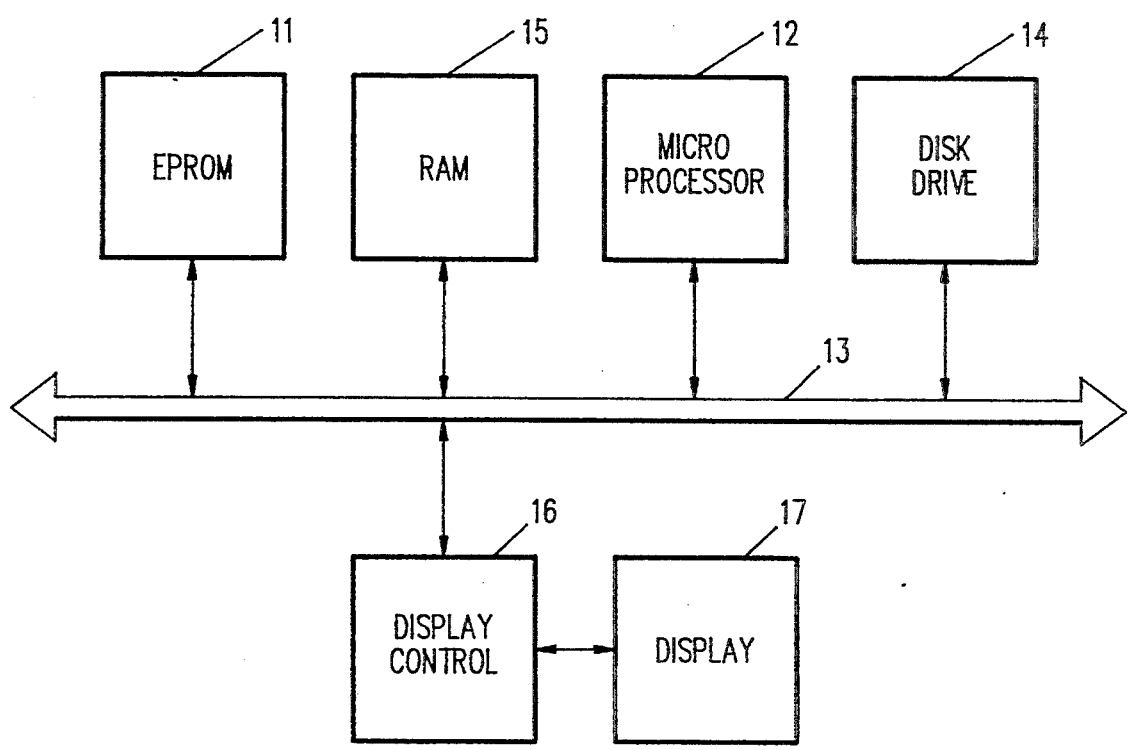
FIG. 7 is a high level block diagram of a data processing system for carrying out the invention.

The method of this invention can be carried out on a personal computer-sized data processing system, such as is shown in FIG. 7. The firmware for carrying out the method is stored in electrically programmable read only memory (EPROM) 11. The operation of the system is controlled by microprocessor 12 which communicates with the various elements of the system via bus 13. A curve's coordinate points are stored, for instance, on disk drive 14 and are transferred into random access memory (RAM) 15 when the curve approximation and display method is to be performed. Once the required number of control polygons has been determined, the coordinates of the beginning and end of each control polygon are employed by display control 16 to construct a curve approximation that is then shown on display 17.

The procedure has been found applicable to not only curves described by a cubic function, but also to rational quadratics (i.e. conics, ellipses, parabolas, and hyperbolas) and further to incremental algorithms for simulating curves. Hereafter, the algorithms for both Bezier subdivision and incremental subdivision will be described, followed by a proof section which substantiates the illustrated relationships.

BEZIER SUBDIVISION FOR CUBICS

The algorithm takes as its input, a cubic curve specified by its control polygon (as indicated in the background of the invention and with respect to FIGS. 1-4). An error tolerance $\Delta_E$ is specified and is the maximum error which the user is willing to tolerate in the curve approximation.

Figure 8:
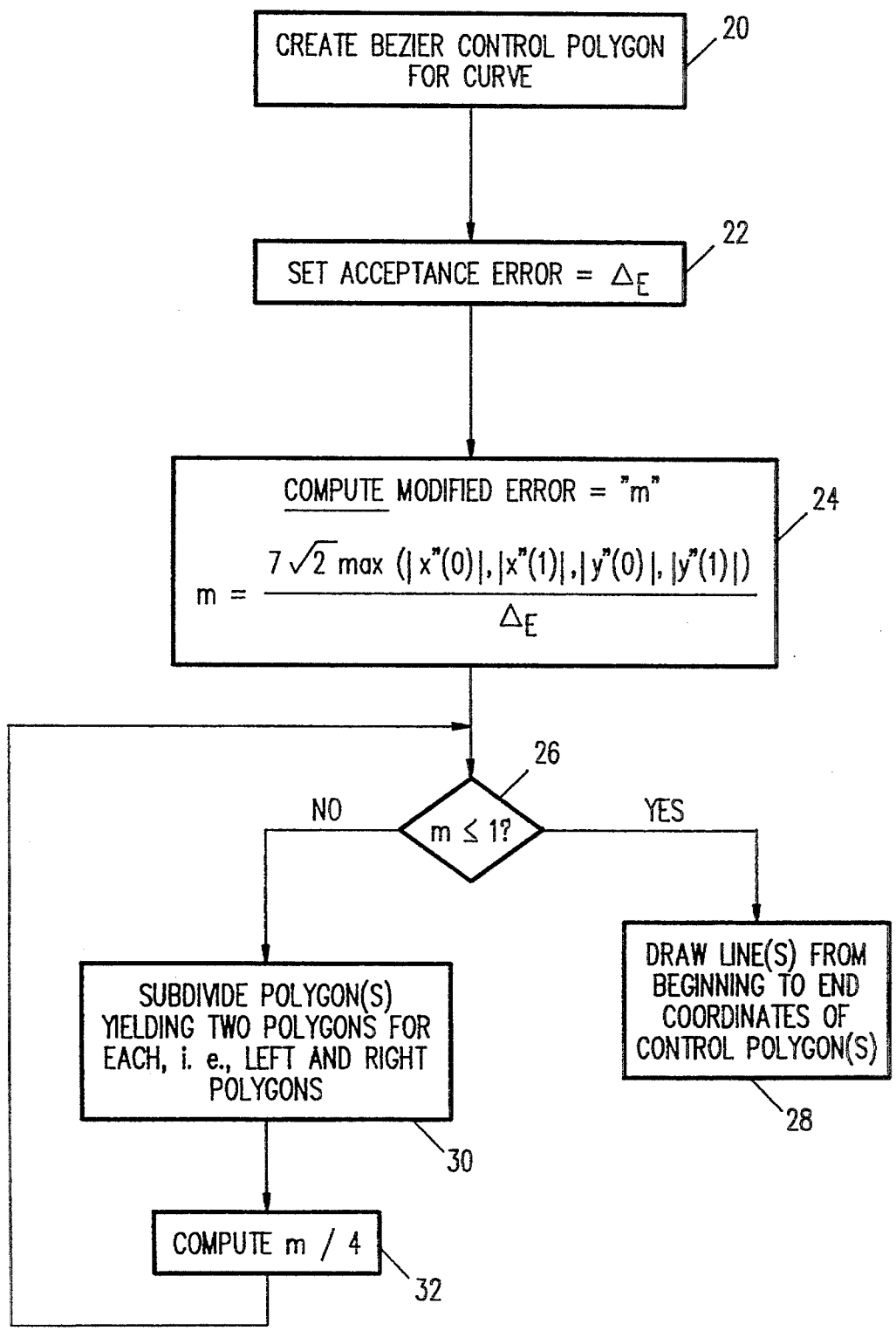
FIG. 8 is a high level flow diagram of the method of the invention as applied to a cubic curve.

Referring to FIG. 8, a flow diagram illustrating the algorithm is shown. Initially, the Bezier control polygon is provided for the curve (box 20) and the maximum error $\Delta_E$ is selected (box 22). A modified error m is then calculated by the equation shown in box 24. It will be noted that the numerator of that equation is the maximum of the second derivatives of the x and y coordinate functions at the beginning and end points of the curve. It turns out that the maximum second derivative value will always occur at either the beginning or end point of the curve, so by testing for the maximum second derivative at those points, one is able to derive the maximum second derivative coordinate function for the curve.

The numerator result is divided by the maximum error $\Delta_E$ and the quotient multiplied by a constant $7\sqrt{2}$ to derive the modified error m. The constant $7\sqrt{2}$ assures that the modified error m does not affect the calculation, substantially, until after approximately the second subdivision. The modified error m is then tested (decision box 26) to see whether its value is less than or equal to one (i.e. if the real error is less than or equal to $\Delta_E$), and if it is, a line is drawn from one end of the control polygon to the other since the error limit has been reached. If not, the polygon is subdivided (or if this is a subsequent step, the polygons are subdivided) leaving, for each subdivided polygon a left polygon and right polygon (box 30). The value of m is then divided by four and tested to determine if its new value is less than or equal to one. If not, the process repeats until the condition set in decision box 26 is met.

It can thus be seen that the modified error calculation need only be made once, after which, the value of m is divided subsequent to a next subdivision and the effort repeated until the error condition is met. As a result, sufficient polygons are generated to meet the error condition without requiring additional calculations of the error function. In effect the number of control polygons to be used is equal to $2^n$, where n=the number of modified error values calculated.

The following is a pseudocode listing for the procedure shown in FIG. 8.

Figure 9:
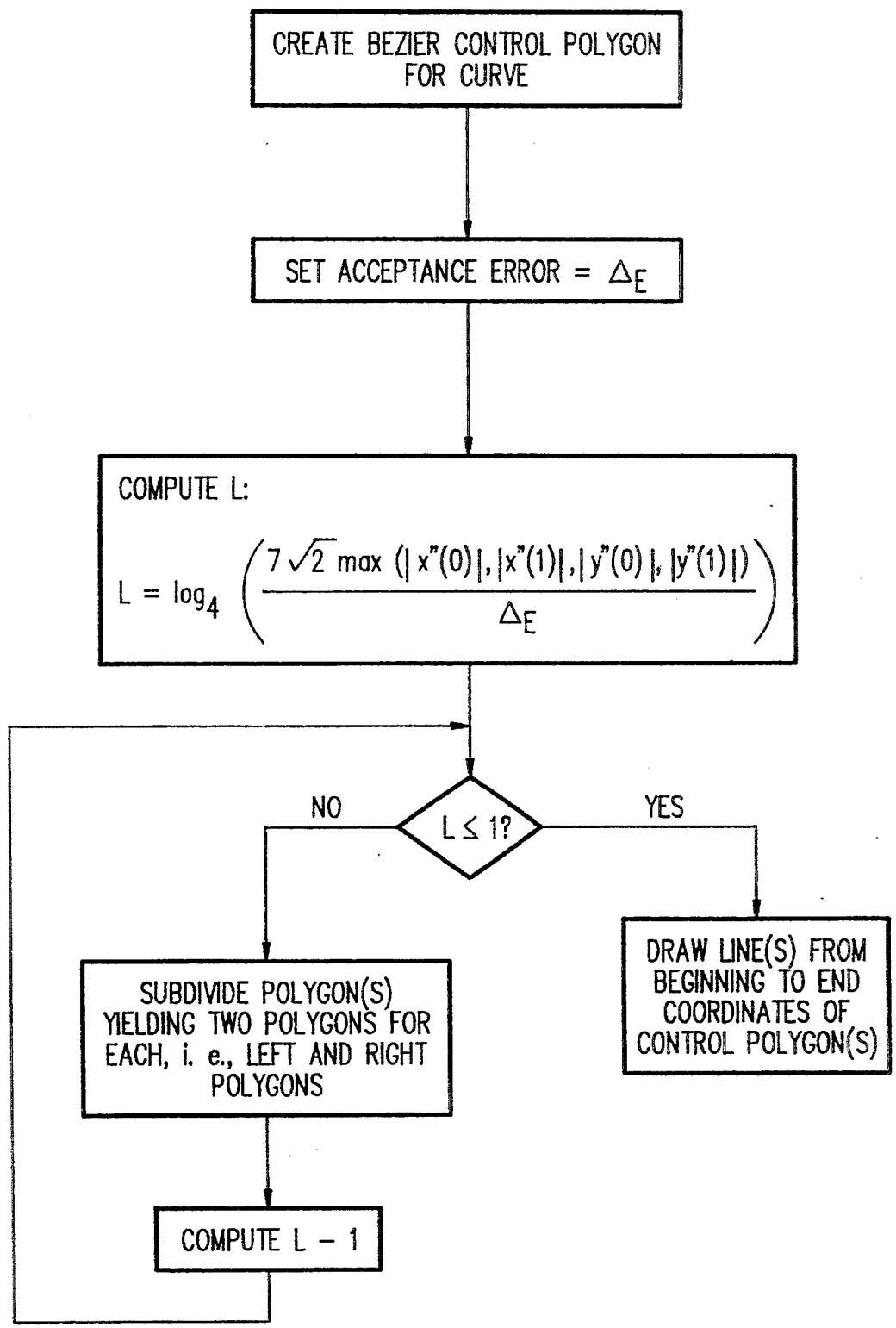
FIG. 9 is a high level flow diagram of an alternate method of the invention as applied to a cubic curve.

Input is a Bezier cubic with its control points, and an error tolerance, $\Delta_E$ Derive the second derivatives of the coordinate functions at the end of points of the cubic.
Compute the Modified Error, $$m = \frac{7\sqrt{2} \max(|x''(0)|, |x''(1)|, |y''(0)|, |y''(1)|)}{\Delta_E}$$

where the primes denote differentiation.
Call the subdivision routine subdivision (cubic, m)
End procedure processcubic
Begin procedure subdivision (cubic, m)
If $m \leq 1$, draw a line from one endpoint of the polygon to the other.
Otherwise,
subdivide the polygon as in the prior art, yielding two polygons, Left Polygon and Right Polygon.
call subdivision (Left Polygon, m/4)
call subdivision (Right Polygon, m/4)
end procedure subdivision An alternative procedure (see. FIG. 9) for accomplishing the same result as above described is as follows:
Input is a Bezier cubic with its control points, and an error tolerance, $\Delta_E$
Derive the second derivatives of the coordinate functions at the end of points of the cubic.
Compute a value $$L = \text{Log}_4 \frac{7\sqrt{2} \max(|x''(0)|, |x''(1)|, |y''(0)|, |y''(1)|)}{\Delta_E}$$

where the primes denote differentiation.
Call the subdivision routine subdivision (cubic, L)
End procedure processcubic
Begin procedure subdivision (cubic, L)
If $L \leq 1$, draw a line from one endpoint of the polygon to the other.
Otherwise,
subdivide the polygon as in the prior art, yielding two polygons, Left Polygon and Right Polygon.
call subdivision (Left Polygon, L-1)
call subdivision (Right Polygon, L-1)
end procedure subdivision The value of $\log_4 (x)$ can be easily calculated by shifting. When $L=\log_4(m)$ is computed, where m is the modified error, what is desired is that L=the smallest positive integer which is not greater than $\log_4(m)$. It is also known that $m > 1$. So, m may be computed as follows:

```
if m<4, then L=1;
otherwise: L=1
    while (m≧4) m=m/4; L=L+1
return (L)
```
This computes L by successive shifting since division by 4 is equivalent to right shifting by 2.

BEZIER SUBDIVISION FOR PARAMETRIC RATIONAL QUADRATICS (CONICS)

As will be remembered from the Background section, the coordinate functions for a rational quadratic are expressed as a fraction having quadratics in the both denominator and the numerator. If x(t), y(t) are the coordinate functions of the conic, it will be recalled (for ease of expression) that the x(t) function in the numerator and denominator, is defined as X(t)/w(t). Similarly, the expression for y(t) is simplified by letting its numerator and denominator respectively equal Y(t)/w(t). The value of $\Delta_E$ is then chosen as the maximum error to be tolerated in the approximation. In the following equations, "a" can represent either x or y, as the case may be. Two quantitites are defined in terms of X, Y, w. The modified error m for an ellipse and a hyperbola (parabola) are as follows:

$$m_{hyperbola} = \max_{a = x,y} \frac{w_0|a_0 - 2a_1 + a_2| + 2|w_0 - w_1|\max_t(a(t))}{2(w_0 + w_1)\Delta_E}$$

$$m_{ellipse} = \max_{a = x,y} \frac{|a_0 - 2a_1 + a_2| + 4\max(a(t))\frac{w_1 - w_0}{w_1 + w_0}}{4\Delta_E} + 2\frac{w_1 - w_0}{w_1 + w_0}$$

To determine if a particular curve is an ellipse or a hyperbola, the values of $w_0$ and $w_1$ are compared. It will be recalled that a rational quadratic has, for its beginning and end coordinates, three coordinate functions X, Y, and w, with w being a "weight" or third dimensional value which determines in which direction the curve is "pulled" and vice versa. If $w_0$ and $w_1$ are the beginning and end coordinate point weights, whether a curve is a hyperbola, ellipse or parabola can be determined from the following (The hyperbola modified error function is used for parabolas).

$w_1 > w_0 =$ hyperbola $w_1 < w_0 =$ ellipse $w_1 = w_0 =$ parabola

Figure 10:
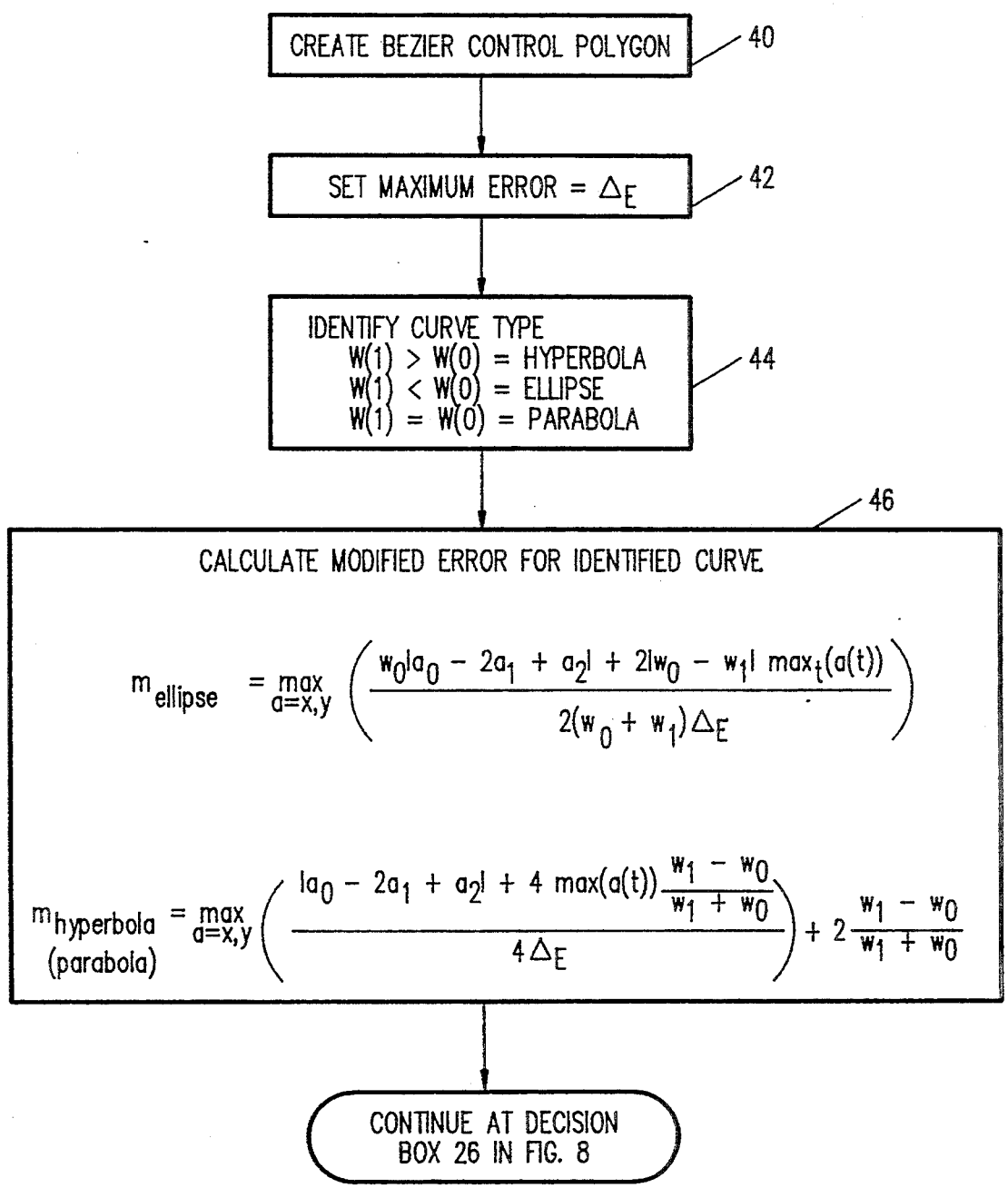
FIG. 10 is a high level flow diagram showing the application of the invention to a conic curve.

The above noted procedures are shown in boxes 40, 42, and 44 in FIG. 10.

Once the type of curve has been identified, then one or the other of the modified error equations (box 46) is solved. It will be recalled from the Background, that the Bezier polygon for a conic is an open sided triangle having points $p_0$, $p_1$ and $p_2$. An equation in box 46 is thus solved by initially substituting for each "a" value the appropriate value of x. The equation is then solved. Then the appropriate values of y are inserted and the equation solved. The maximum value obtained from the solution is then equal to the modified error m for the curve.

The procedure completes by following the procedure shown in boxes 26, 28, 30, and 32 in FIG. 8. Here again, it can be seen that the number of polygonal subdivisions required to achieve the desired error is determined by the number of divisions by 4 required to reduce the value of m to less than or equal to 1.

The following is a pseudocode listing for the procedure shown in FIG. 10:

```
begin procedure processconic (conic, Δe)
    input is a conic specified as a rational quadratic, m
    and an error tolerance, Δe
    if the conic is an ellipse, compute m=m_ellipse
    if the conic is an hyperbola, compute m=m_hyperbola
    call the conicsubdivision routine conicsubdivision
        (conic, m)
end procedure processconic
    begin procedure conicsubdivision (conic, m)
    if m≦1, draw a line from one endpoint of the conic to
        the other.
    otherwise, subdivide the conic as in the prior art
        section, yielding two polygons, LeftConic and
        RightConic.
    call conicsubdivision (LeftConic, m/4)
    call conicsubdivision (RightConic, m/4) end procedure conicsubdivision
```

Figure 11:
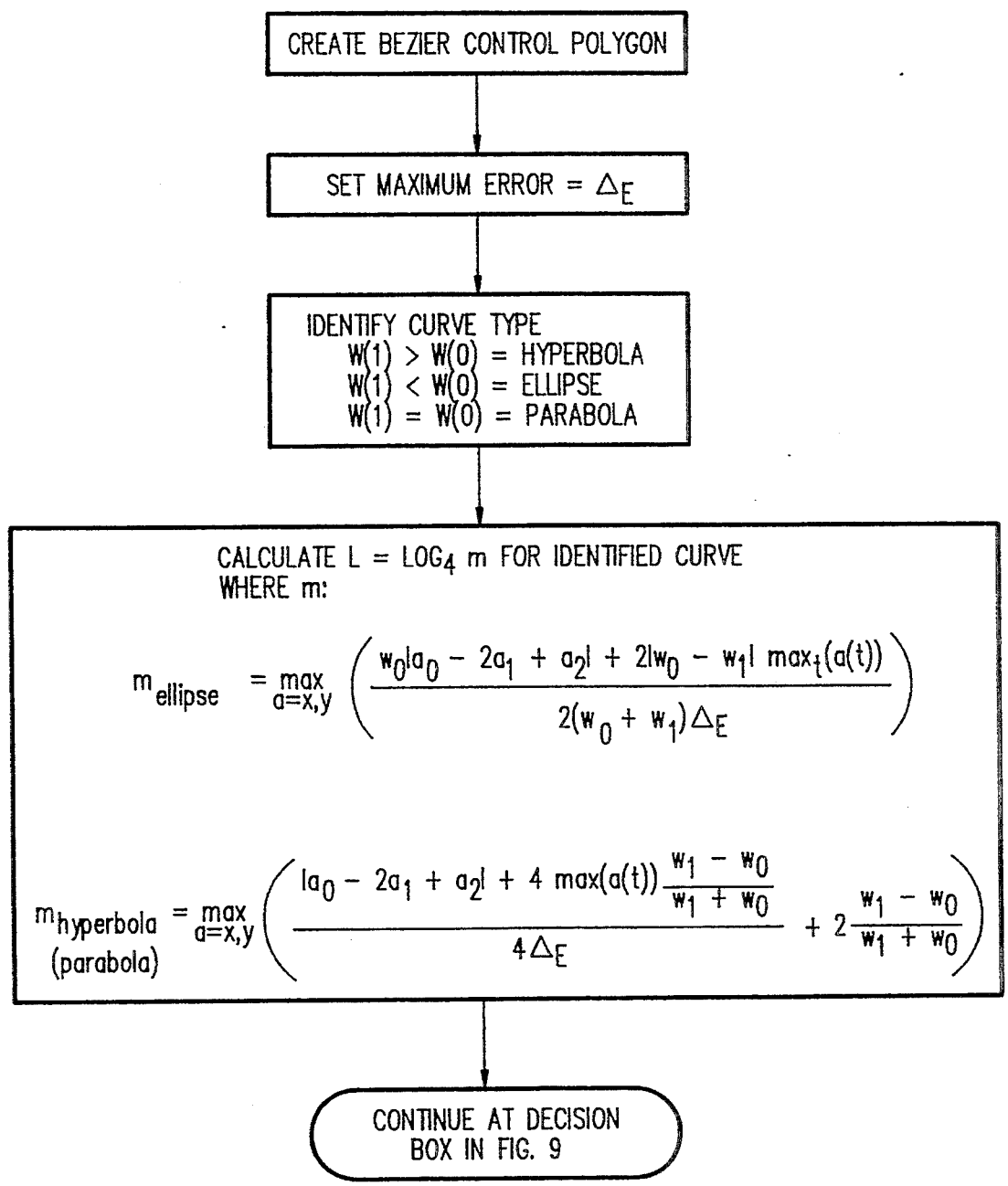
FIG. 11 is a high level flow diagram showing a modification to the method of FIG. 10.

An alternative procedure (see FIG. 11) that accomplishes the same result as above is as follows:

```
begin procedure processconic (conic, Δe)
    input is a conic specified as a rational quadratic, m
    and an error tolerance, Δe
    if the conic is an ellipse, compute L=Log4m_ellipse
    if the conic is an hyperbola, compute L=Log4m_hyperbola
    call the conicsubdivision routine conicsubdivision
        (conic, L)
end procedure processconic
    begin procedure conicsubdivision (conic, m)
    if L≦1, draw a line from one endpoint of the conic to
        the other.
    otherwise, subdivide the conic as in the prior art
        section, yielding two polygons, LeftConic and
        RightConic.
    call conicsubdivision (LeftConic, L-1)
    call conicsubdivision (RightConic, L-1) end procedure conicsubdivision
```

INCREMENTAL ALGORITHM FOR CUBICS

As indicated in the Background, incremental algorithms are also used to approximate curves. Such algorithms start at one end of the curve and successively step along the curve by a predetermined amount and at each interval, determine whether the interval is small enough to give a good approximation of the curve by an inserted straight line. This invention enables the best time step along the curve to be precalculated and then simply utilized without intervening error calculations. Furthermore, rather than requiring a modified error calculation, a direct calculation is made of the optimum number of time steps to enable a given error to be achieved. It has been determined that the best number of time steps is $2^L$ with L being dependent upon the maximum second derivative of either the x or y coordinate functions at the beginning and end points of the curve.

Figure 12:
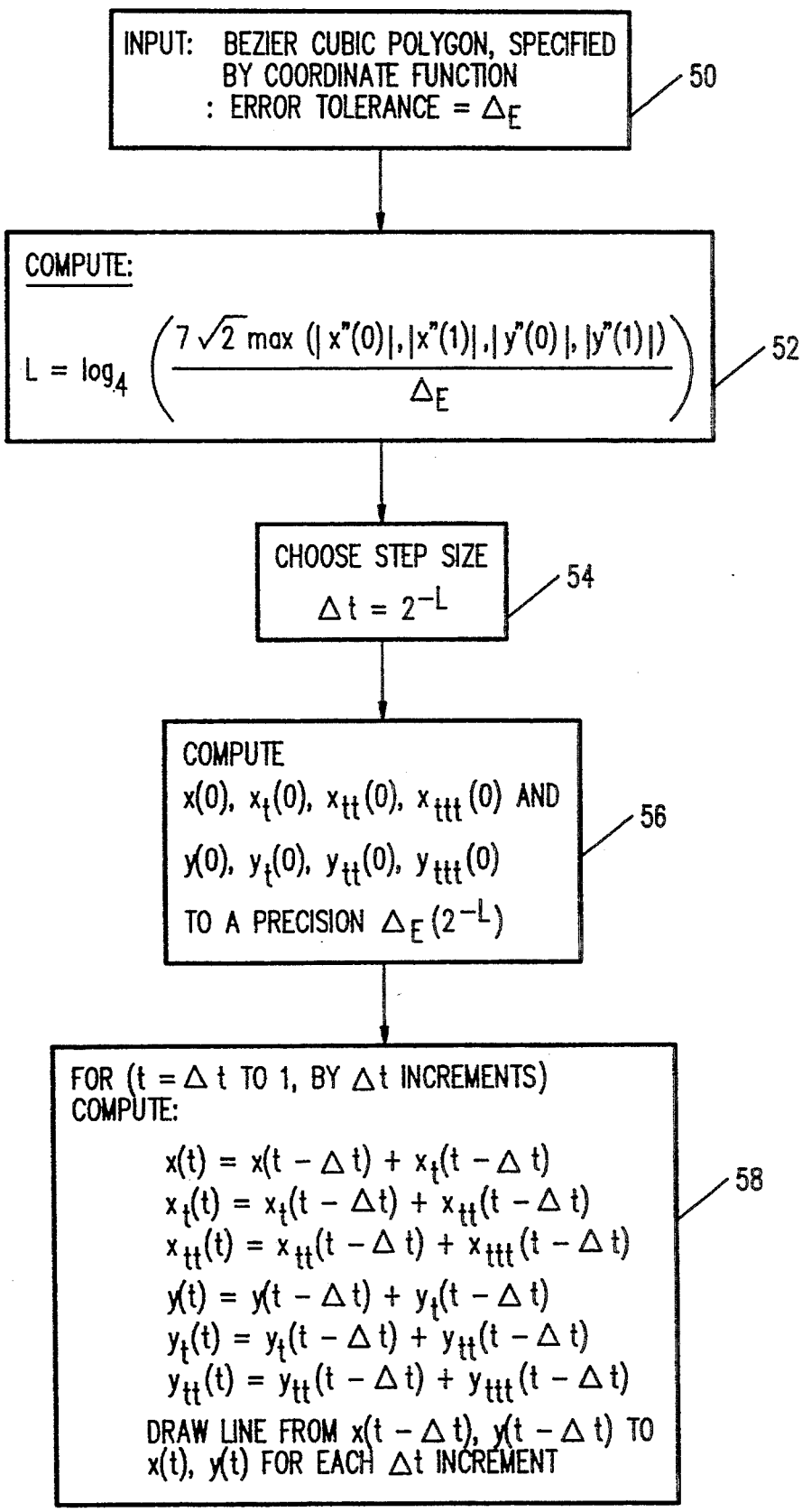
FIG. 12 is a high level flow diagram showing an application of the method of the invention to an incremental algorithm for approximating a cubic curve.

As shown in FIG. 12, the algorithm starts by having as its inputs, a Bezier cubic polygon specified by its coordinate functions and a specified tolerance error $\Delta_E$ (box 50). The procedure then computes the value of L using the expression shown in box 52. Here again, the value of L is directly related to the maximum second derivative of one of the coordinate functions of the curve (L being the optimum number of step sizes required to achieve the error tolerance $\Delta_E$). The algorithm then proceeds along the prior art incremental subdivision route shown in boxes 54, 56 and 58. In essence, the step size is chosen as being the reciprocal of $2^L$. Next, finite differences $x_t$, $x_{tt}$, $x_{ttt}$, $y_t$, $y_{tt}$, $y_{ttt}$, as defined in the Background of the invention are calculated for the x and y coordinate functions at the beginning coordinate, to a precision determined by the error tolerance and the step size. Then, the functions shown in box 58 are calculated using $\Delta t$ increments to determine the succeeding coordinate points. Here again, it is to be noted that subsequent to the calculation shown in box 52, there is no further error calculation. The requisite straight lines are then drawn.

A pseudo code description for this procedure follows:

compute $$L = \log_4 \left( \frac{7\sqrt{2} \max(|x''(0)|,|x''(1)|,|y''(0)|,|y''(1)|)}{\Delta_E} \right)$$

choose step size $\Delta t = 2^{-L}$ compute $x(0)$, $x_t(0)$, $x_{tt}(0)$, $x_{ttt}(0)$ to a precision $\Delta_E 2^{-L}$ compute $y(0)$, $y_t(0)$, $y_{tt}(0)$, $y_{ttt}(0)$ to a precision $\Delta_E 2^{-L}$ for ($t = \Delta t$ to 1, by $\Delta t$ increments)

$x(t) = x(t-\Delta t) + x_t(t-\Delta t)$ $x_t(t) = x_t(t-\Delta t) + x_{tt}(t-\Delta t)$ $x_{tt}(t) = x_{tt}(t-\Delta t) + x_{ttt}(t-\Delta t)$ $y(t) = y(t-\Delta t) + y_t(t-\Delta t)$ $y_t(t) = y_t(t-\Delta t) + y_{tt}(t-\Delta t)$ $y_{tt}(t) = y_{tt}(t-\Delta t) + y_{ttt}(t-\Delta t)$ draw line from $x(t-\Delta t)$, $y(t-\Delta)$ to $x(t)$, $y(t)$.
end procedure processcubic

INCREMENTAL ALGORITHM FOR CONICS

Figure 1:
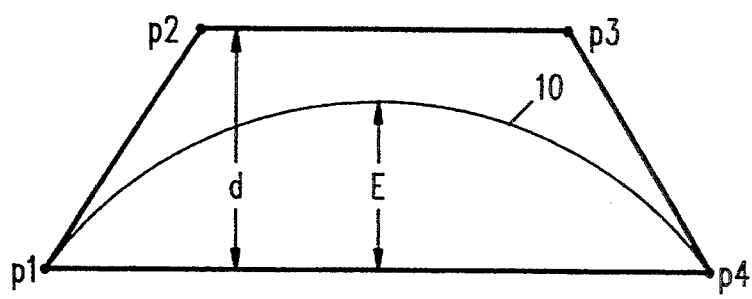
FIGS. 1-4 illustrate the prior art Bezier subdivision of a curve to enable representation of a curve by straight line segments.
Figure 2:
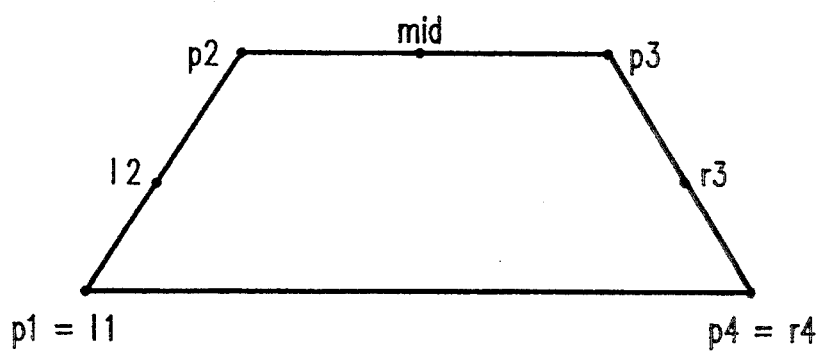
Figure 3:
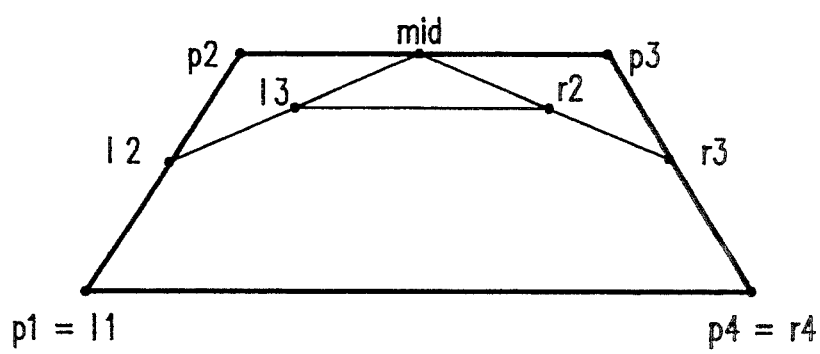
Figure 4:
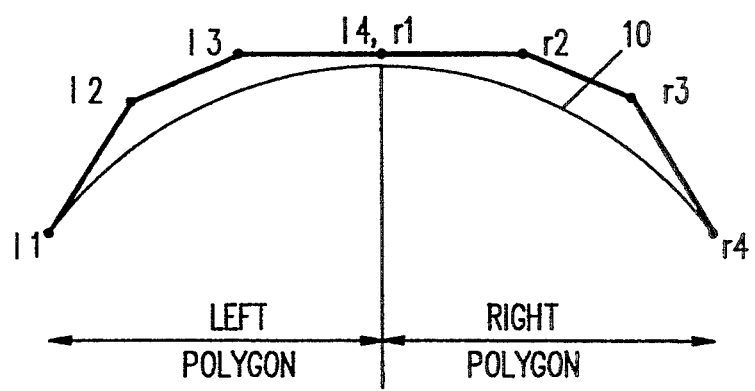
Figure 5:
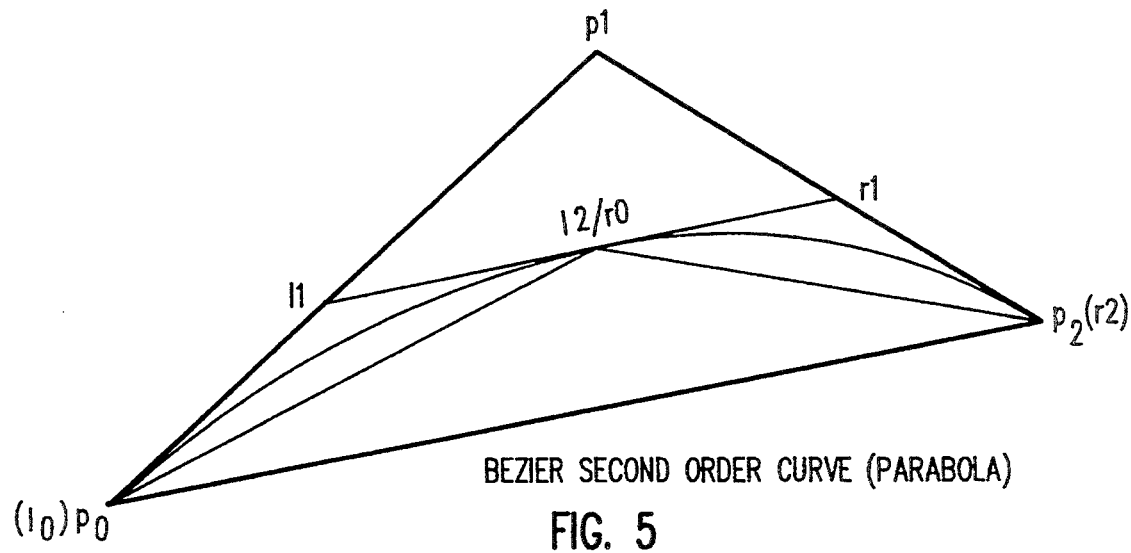
FIG. 5 illustrates a prior art Bezier subdivision of a second order curve (parabola).
Figure 6:
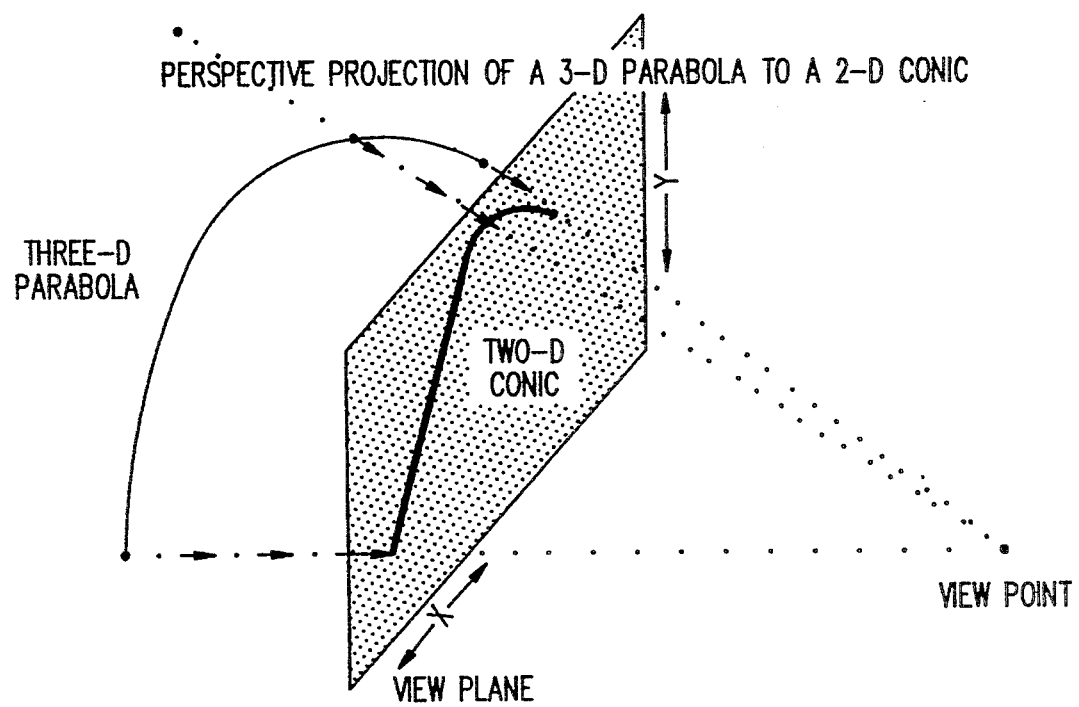
FIG. 6 illustrates a perspective projection of a 3-d parabola onto a viewplane to obtain a 2-d conic.
Figure 13:
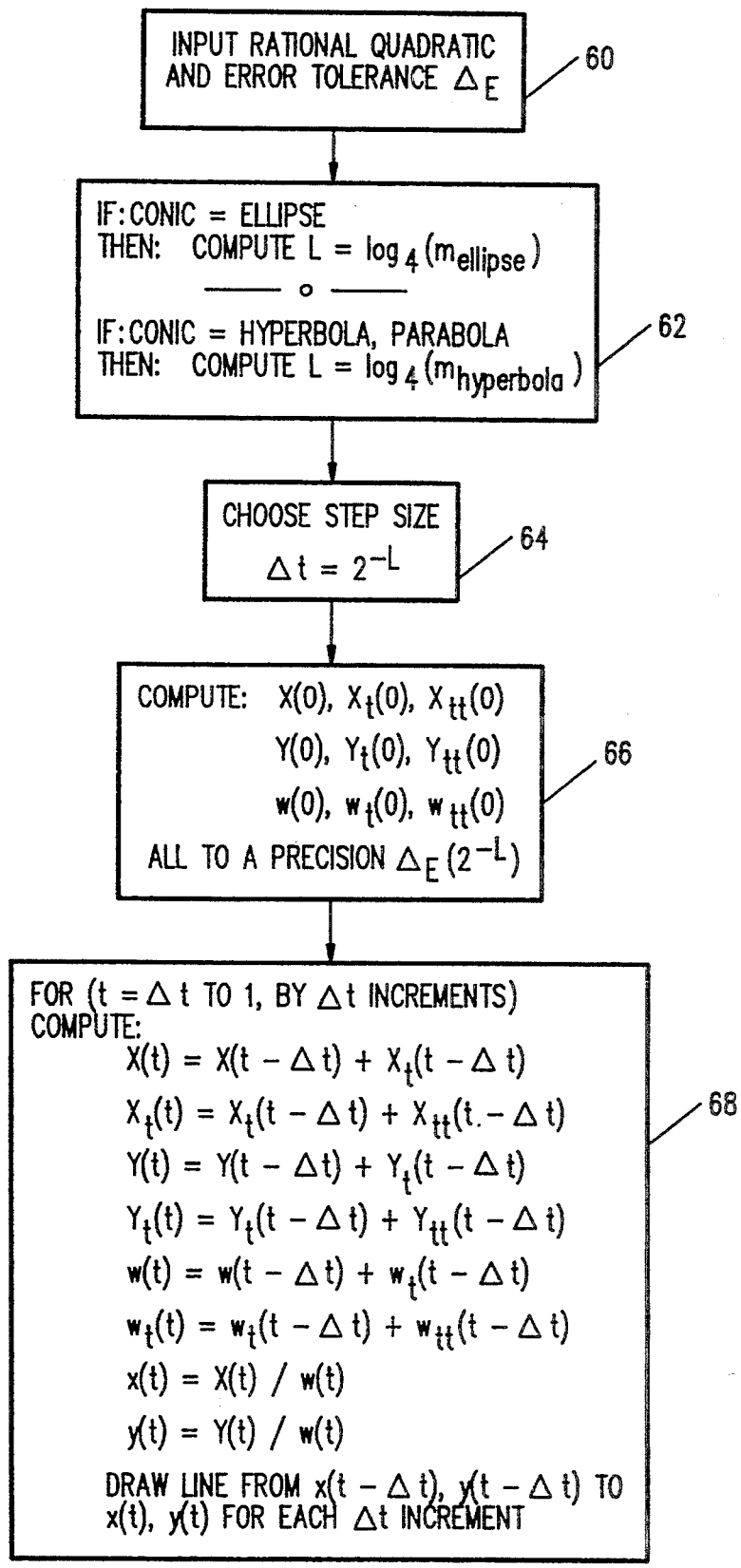
FIG. 13 is a high level flow diagram showing the application of the method to an incremental algorithm for the approximating a conic curve.

In lieu of using the Bezier subdivision for conics, an incremental subdivision technique can be employed. In this instance, the modified error expressions for both ellipses and hyperbolas are utilized, as above described. With reference to FIG. 13, a rational quadratic and error tolerance $\Delta_E$ are input (box 60). Then, if the conic is determined to be an ellipse, L is computed as shown in box 62 using the modified error equation shown in box 46, FIG. 6. If, on the other hand, the conic is determined to be a hyperbola, then L is computed, as shown in box 62, using the equation shown in box 46, FIG. 6. At this point, the number of increments required to achieve an error tolerance $\Delta_E$ is known. Thus, knowing the value of L, the number of steps chosen are $2^L$ and the step size $\Delta t$ is chosen as $2^{-L}$ (box 64).

At this point, the procedure continues, as in prior art incremental algorithms, and computes the values shown in box 66. Subsequently, the specific increments and their weights are derived as shown in box 68, and the requisite lines drawn.

A pseudocode description for this procedure follows:

begin procedure processconic(conic, $\Delta_E$)
input is a conic specified as a rational quadratic, and an error tolerance, $\Delta_E$
if the conic is an ellipse, compute $L = \log_4 (m_{ellipse})$
if the conic is an hyperbola, compute $L = \log_4 (m_{hyperbola})$
choose step size $\Delta t = 2^{-L}$
compute $X(0)$, $X_t(0)$, $X_{tt}(0)$ to a precision $\Delta_E 2^{-L}$
compute $Y(0)$, $Y_t(0)$, $Y_{tt}(0)$ to a precision $\Delta_E 2^{-L}$
compute $w(0)$, $w_t(0)$, $w_{tt}(0)$ to a precision $\Delta_E 2^{-L}$
for($t = \Delta t$ to 1 by $\Delta t$)

$X(t) = X(t-\Delta t) + X_t$ $X_t(t) = X_t(t-\Delta t) + X_{tt}(t-\Delta t)$ $Y(t) = Y(t-\Delta t) + Y_t(t-\Delta t)$ $Y_t(t) = Y_t(t-\Delta t) + Y_{tt}(t-\Delta t)$ $w(t) = w(t-\Delta t) + w_t(t-\Delta t)$ $w_t(t) = w_t(t-\Delta t) + w_{tt}(t-\Delta t)$ $x(t) = X(t)/w(t)$ $y(t) = Y(t)/w(t)$ draw line from $x(t-\Delta t)$, $y(t-\Delta)$ to $x(t)$, $y(t)$
end procedure processconic

PROOFS (1) Proof of correctness of the bound for cubics

This section gives a proof of the correctness of the bound on the depth of the cursion which is necessary to make the algorithm work.

Dahmen proved [Journal of Computational and Applied Mathematics 16(1986) 145–158 "Subdivision algorithms converge quadratically"] that a class of subdivision algorithms which includes Bezier Subdivision converges quadratically and that this bound is tight in the sense that no cubic bound is possible. Using this result, along with several computations, a formula has been found for an upper bound on the depth of the tree necessary to subdivide to a given error threshold. Furthermore, this formula is readily computed (requiring 13 additions, 6 shifts, 3 compares and a variable number of shifts which is less than half the word size.) and needs to be computed only once, using quantities available before the subdivision starts.

Dahmen's result, is an estimate for the distance of the control points from the curve in terms of a constant, the granularity of the partition of the time variable, and the second derivative. The general form of his Theorem 2.1 gives an estimate of the form $$|S_\delta - P(t\delta)| < C_k^* \delta^{2*} ||P''||_\infty$$

Where $|Sd - P(td)|$ is the distance between the control points and the curve, evaluated at a point which is the average of neighboring partition points. $\delta$ is a measure of the granuality of the partition, and $P''$ is the second derivative of the curve. $||f||_\infty$ is the $L\infty$ norm of the function, f. k is the order of the curve. $C_k$ is a constant which depends only on k. A special case of this result is needed where $\delta$ is a (negative) power of 2, since the subdivision can be thought of as evaluation of points on the curve for t equal to multiples of some power of 2. Due to the fact that cubics are considered, the LHS can be thought of simply as the distance from the control points to the curve. This special case result is assumed with this interpretation.

If $C_k$ is known, then it can be found exactly how far the iteration will need to go. Dahmen's proof does not, however generate a value for $C_k$. The proof relies on the fact that the basis for the subdivision is uniformly stable and uses the uniform stability inequality as the starting point. In fact, a careful reading of the proof reveals that $C_k$ is exactly the reciprocal of the constant which appears in the uniform stability inequality. So, an upper bound on $C_k = m^{-1}$ is computed where $$m = \min_r \left( \frac{\|\Sigma r_i B_i\|_\infty}{\|r\|} \right)$$

[Note that uniform stability of a basis is the same as m being finite and for the purposes of the proof, will be taken as the definition.] The control vector r has $k+1$ components and the norm on the space of control vectors is given by, $$||r|| = \max |r_i|$$

$B_i$ are some basis functions for the polynomial space. So, the $\Sigma r_i B_i$ is an element of the polynomial space with control vector r. [Note that control points are simply coefficients in a basis. They are called control points because they also have some geometric significance]. That element is called $P_r$. In this case, the $B_i$ are the Bernstein-Bezier (hence called B-B) Basis functions for polynomials of degree 3.

$$B_0(t) = (1-t)^3$$

$$B_1(t) = 3t(2-t)$$

$$B_2(t) = 3t^2(1-t)$$

$$B_3(t) = t^3$$

So, m measures how small the sup norm of the function can get when the control points are made small. deBoor calculates the value of m for the power basis. The calculation of m for the B-B basis will follow his closely, but will have some differences which exploit features of the B-B basis. deBoor shows that an equivalent formula for m is $$m^{-1} = \max_i \max_r \left( \frac{|r_i|}{\|P_r\|_\infty} \right)$$

The following quantitites may be defined $$m_i^{-1} = \max_r \left( \frac{|r_i|}{\|P_r\|_\infty} \right)$$

So that $m^{-1} = \max_i m_i^{-1}$ Now consider the B-B basis under the reparameterization as t goes to $1-t$. This exchanges $r_0$ with $r_3$ and $r_1$ with $r_2$ but leaves the image of the curve (and hence its sup norm) unchanged. From this it can be concluded that $$m_0^{-1} = m_3^{-1}$$

$$m_1^{-1} = m_2^{-1}$$

To estimate $m_0^{-1}$ and $m_1^{-1}$ the following fact is used together with the exact form of the transformation between the B-B basis and the power basis and the relation of the coordinates of the power basis to the derivatives. For $0 \leq a < b$ $$\max_{P \in P^n} \left( \frac{P^{(i)}(0)}{\|P\|_\infty} \right) = T_{n-1}^{(i)} \left( \frac{a+b}{a-b} \right) * \left( \frac{2}{b-a} \right)^i$$

where $T_{n-1}^{(i)}$ is the $i^{th}$ derivative of the $n-1^{th}$ Chebyshev polynomial, and $p^n$ is the n dimensional vector space of all polynomials of degree less than $n-1$. In this special case, this formula becomes $$\max_{p \in P_4} \left( \frac{P^{(i)}(0)}{\|P\|_\infty} \right) = T_3^{(i)}(1) * 2^i$$

Suppose a third degree polynomial, P(t). Call its coordinates in the B-B $r_i$ and its coordinates in the power basis $a_i$, then, $$r_0 = a_0$$

$$r_1 = \tfrac{1}{3} a_1 + a_0$$

$$a_0 = P(0)$$

$$a_1 = P'(0)$$

It can be seen, now that $m_0^{-1} = 1$ $$m_0^{-1} = \max_r \left( \frac{|r_0|}{\|P_r\|_\infty} \right) = \max_r \left( \frac{|P(0)|}{\|P_r\|_\infty} \right) = T_3(1) = 1$$

The argument for $m_1^{-1}$ is more involved. Pick some cubic polynomial, P, with coordinates r in the B-B basis and a in the power basis.

$$\frac{|r_1|}{\|P\|_\infty} = \frac{|\tfrac{1}{3} a_1 + a_0|}{\|P\|_\infty} \leq \frac{1}{3} \frac{|a_1|}{\|P\|_\infty} + \frac{|a_0|}{\|P\|_\infty} = \frac{1}{3} \frac{|P'(0)|}{\|P\|_\infty} + \frac{|P(0)|}{\|P\|_\infty}$$

Since this inequality is valid for every polynomial in the space, it must be valid for the maximum over all polynomials in the space.

$$\max_P \left( \frac{|r_1|}{\|P\|_\infty} \right) \leq \max_P \left( \frac{1}{3} \frac{|P'(0)|}{\|P\|_\infty} + \frac{|P(0)|}{\|P\|_\infty} \right) \leq$$

$$\max_P \left( \frac{1}{3} \frac{|P'(0)|}{\|P\|_\infty} \right) + \max_P \left( \frac{|P(0)|}{\|P\|_\infty} \right)$$

So, $$\max_P \left( \frac{|r_1|}{\|P\|_\infty} \right) \leq \tfrac{1}{3} T_3'(1) * 2 + T_3(1) = \frac{18}{3} + 1 = 7$$

At the end of this calculation, the desired result is, $$C_3 \leq 7$$

This may or may not be the best bound. However another calculation yields $C_3 \geq 3.5$. The difference in the upper and lower bounds is a factor of 2. Since a factor of 4 in $C_3$ is required to double the average execution time for the algorithm there is little to gain from tightening the bound.

Now that an upper bound on $C_3$ has been found, a calculation is needed to get the precomputable ending condition. If Dahmen's result is rewritten using the upper bound, $$|S_\delta - P(t_\delta)| \leq 7*\delta^{2}*||P''||_\infty$$

So, if it is required $$|S_\delta - P(t_\delta)| \leq \Delta$$

This can be accomplished by requiring $$7*\delta^{2}*||P''||\sqrt{} \leq \Delta$$

then the following is needed $$\delta^2 \leq \frac{\Delta}{7 * ||P''||_\infty}$$

Also, restrict d to be a power of two, say, $2^{-l}$ $$l \geq \log_4\left(\frac{7 * ||P'||_\infty}{\Delta}\right)$$

This reveals the error in each coordinate function, but if Euclidean error is desired another calculation is required.

$$\Delta_{Euclid} = \sqrt{\Delta_x^2 + \Delta_y^2}$$

If the Euclidean error is bounded by $\Delta_E$, $\Delta x$ and $\Delta y$ must be bounded by $$\frac{\sqrt{2}}{2} * \Delta_E.$$

This gives a formula 1 in terms of the Euclidean error which is acceptable in the rasterized curve.

$$l \geq \log_4\left(\frac{\sqrt{2} * 7 * ||P'||_\infty}{\Delta_E}\right)$$

Since P is assumed to be a cubic, P'' is a linear function and hence must take its maximum and minimum values at the endpoints of its interval of definition. This gives $$l \geq \log_4\left(\frac{7\sqrt{2}\ \max(|x''(0)|, |x''(1)|, |y''(0)|, |y''(1)|)}{\Delta_E}\right)$$

which is the precomputable ending condition. In the most often used special case, of $\Delta_E = \frac{1}{2}$, the following results $$l \geq \log_4(\max(|x''(0)|, |x''(1)|, |y''(0)|, |y''(1)|)) + 2.154$$

(2) Derivations of the ending conditions for rational quadratics (conics etc.)

This section is devoted to calculating formulae for ending conditions for conic subdivision. In para 2.2 a simple test at each iteration is shown to be an ending condition. In para 2.5 a uniform bound on the depth of subdivision necessary for a given ellipse is derived. This bound is a worst case estimate for the ending condition in 2.2. In para 2.6 a similar bound is derived for hyperbolae. In the next subsection, a bound is generated on the error in a straight line approximation to a parametric quadratic after Bezier subdivision is carried out to a depth of n. This will be used in later paragraphs to derive an ending condition and a bound on the maximum possible depth of the tree for the subdivision of rational parametric quadratics.

(2.1) Prerequisite Calculations

Consider the Bezier quadratic coordinate function $$c(t) = c_0(1-t)^2 + 2c_1 t(1-t) + c_2 t^2$$

Now, consider the error made in approximating this curve for $0 < t < \frac{1}{2}$ by the line which joins c0 to c1. Also approximate c(t) by the line from c1 to c2 for $\frac{1}{2} < t < 1$. This approximation will be called approximation by the legs of the control triangle to distinguish it from approximation by the base of the control triangle which will be introduced later. The arguments for each side of $\frac{1}{2}$ are similar and only the argument for $0 < t < \frac{1}{2}$ will be presented. In the following we will assume $0 < t < \frac{1}{2}$. The error is then, $$E(c,t) = (c_0 + 2(c_1 - c_0)t) - c(t)$$

Take the Taylor expansion of c(t) about $t=0$ and calculate $$E(c,t) = (2c_1 - c_0 c_2)t^2$$

Now, let l(c) and r(c) be the curves produced by subdividing c. The arguments for right and left side are identical, so only the left side will be shown. So, $$E(l(c), t) = (2l(c)_1 - l(c)_0 - l(c)_2)t^2$$
$$E(l(c), t) = E(r(c), t) = \frac{(2c_1 - c_0 - c_2)t^2}{4} = \frac{1}{4} E(c, t)$$

Hence, with each subdivision, pointwise error is reduced by a factor of four. This is also true of the worst case error.

So, for a Curve, c(t), let $s^n$ (c)(t) denote n applications of either r or l to c(t). Hence $s^n$ (c)(t) is short hand for any of the curves which appear at depth n in the tree. In order to simplify the notation, let $s^n(c)$ denote the particular segment at depth n which is being tested for termination. This corresponds to letting $s^n$ take on specific value. For example, $s^2$ takes the values rl, rr, lr, and ll. The pointwise error after n subdivisions is $$E(s^n(c), t) = (\tfrac{1}{4})^n (2c_1 - c_0 - c_2) t^2$$

The largest absolute value of the error occurs when $t = \frac{1}{2}$ so, $$\max(|E(s^n(c), t)|) = (\tfrac{1}{4})^{n+1}|2c_1 - c_0 - c_2|$$

If the curve for $0 < t < 1$ is approximated by the line from $c(0)$ to $c(2)$, this is called approximation by the base of the control triangle.

By looking at a plot of $c(t)$ and the $c_i$ in the c-t plane, it can be seen that the maximum error for approximation by the legs occur at the same point, $t = \tfrac{1}{2}$. This is because $c(\tfrac{1}{2})$ is the midpoint of the line connecting $c_1$ with the midpoint of the line connecting $c_0$ to $c_2$. So, the maximum error for the two approximations is the same, occurs at the same point and the two errors are of opposite sign. From this special case, the general result can be generated.

(2.2) General Ending Condition
(2.3) Errors in the Numerator and Denominator

Recall that for the subdivision of conics, (X,Y, w) are weighted points where $X_i = x_i w_i$, $Y_i = y_i w_i$ which then project down under perspective projection to the correct answer. Each of these coordinate functions behaves like c of the previous paragraph. Let A denote X or Y and let a denote x or y respectively so the argument need be given only once.

The curve may be reparametrized in order to get $w_0 = w_2$. So using equation 2 it can be concluded that for approximation by the legs of the triangle, $$E(s^n(A), t) = (\tfrac{1}{4})^n(2a_1w_1 - w_0 a_0 - w_0 a_2)t^2$$

$$E(s^n(w), t) = (\tfrac{1}{4})^n 2(w_1 - w_0)t^2$$

Now, translate so that $a_1$ lands at 0. In this new coordinate system, $a_0$ becomes $a_0 - a_1$, $a_1$ becomes zero, $a_2$ becomes $a_2 - a_1$, so the error bound for $s^n(A)(t)$ becomes $$E(s^n(A), t) = (\tfrac{1}{4})^n w_0(2a_1 - a_0 - a_2)t^2$$

For approximation of an ellipse by the base, $$|E(s^n(A), t)| \leq (\tfrac{1}{4})^{n+1} w_0|2a_1 - a_0 - a_2|$$

$$0 \leq E(s^n(w), t) \leq (\tfrac{1}{4})^{n+1} 2(w_0 - w_1)$$

recall that for an ellipse, $w_0 \geq w_1$.

(2.4) Error in a fraction

Suppose the two quantities, $x + \Delta x$ and $y + \Delta y$. $x$ and $y$ are the true values while $\Delta x$ and $\Delta y$ are errors in the quantities. What is then the error in the quotient of the two quantitites. Algebra gives.

$$\frac{x + \Delta x}{y + \Delta y} - \frac{x}{y} = \frac{y\Delta x - x\Delta y}{y(y + \Delta y)}$$

Applying this formula to the problem, i.e. letting $x = s^n(A)(t)$ and $y = s^n(w)(t)$, the following results $$E(s^n(a), t) = \frac{s^n(w)(t)E(s^n(A), t) - s^n(a)(t)s^n(w)(t)E(s^n(w), t)}{s^n(w)(t)(s^n(w)(t) + E(s^n(w), t))}$$

where $s^n(a)(t) = \dfrac{s^n(A)(t)}{s^n(w)(t)}$, the desired curve.

Dividing top and bottom by $s^n(w)(t)$ $$E(s^n(a), t) = \frac{E(s^n(A), t) - s^n(a)(t)E(s^n(w), t)}{s^n(w)(t) + E(s^n(w), t)}$$

By choosing approximation by the base line for ellipses and approximation by the legs for hyperbolas, it can be insured that $E(s^n(w), t)$ is non-negative. This allows the following to be written $$E(s^n(a), t) \leq \frac{E(s^n(A), t) - s^n(a)(t)E(s^n(w), t)}{s^n(w)(t)}$$

By plugging in the maximum errors and taking absolute values in the numerator as well as worst case estimates for other quantities in the denominator, the following results.

$$E(s^n(a), t) \leq \left(\frac{1}{4}\right)^{n+1} \left( \frac{|w_0|}{\min_t(s^n(w)(t))} |a_0 - 2a_1 + a_2| + \frac{2|w_0 - w_1|\max_t(s^n(a)(t))}{\min_t(s^n(w)(t))} \right)$$

In order to make this more computationally tractable, the fact that $\max_t(s^n(a)(t)) \leq \max_t(a(t))$ is used and results in $$E(s^n(a), t) \leq \left(\frac{1}{4}\right)^n \frac{K}{\min_t(s^n(w)(t))}$$

where $$K = \frac{w_0|a_0 - 2a_1 + a_2| + 2|w_0 - w_1|\max_t(a(t))}{4}$$

and is precomputable before any subdivision begins. Since the control points of $s^n(w)(t)$ are known at each iteration, and are a weighted average of two quantitites, an estimate is derivable for $\min_t(s^n(w)(t))$ at each iteration by using the smallest control point.

Suppose that it is wanted to ensure that $E(s^n(a), t) \leq b$. This can be done by ensuring that the right hand side of equation 4 is less than b. With rearrangement, the check for termination becomes $$\left(\frac{1}{4}\right)^n \frac{K}{b} \leq \min_t s^n(w)(t)$$

which takes one shift and one comparison at each node to compute.

Up to this point, ellipses and hyperbolas have been treated together. However, in order to prove that this is a good bound and to derive a formula to precompute the sufficient depth of a uniform tree, each case must be analyzed separately.

(2.5) Precomputable Bound for Ellipses For ellipses, it can be shown that such an estimate generates a formula for the sufficient depth of a uniform tree. This is done using the fact that for ellipses, $w_0 > w_1$ and $$s^n(w) \geq \frac{w_0 + w_1}{2}$$

Beginning with formula 3, plugging in the bounds for ellipses, and applying the above facts, along with the fact that $s^n(a)(t) \leq \max_t(a(t))$ the following results $$E(s^n(a),t) \leq \left(\frac{1}{4}\right)^{(n+1)} \left(\frac{2w_0}{w_0 + w_1} |a_0 - 2a_1 + a_2| + \frac{4|w_0 - w_1|}{w_0 + w_1} \max_t(a(t))\right)$$

If it is required that $E(s^n(a),t) \leq b$, any n satisfying $$n \geq \log_4\left(\frac{w_0 |a_0 - 2a_1 + a_2| + 2|w_0 - w_1|\max_t(a(t))}{2(w_0 + w_1)b}\right)$$

will do. So, for an ellipse, the ending condition will never generate a tree deeper than the bound given in the previous equation. Hence subdividing uniformly to that depth will also generate an accurate curve.

(2.6) Precomputable Bound for Hyperbolas

In this section a precomputable bound for hyperbolas is found. Starting with equation 3 and plugging in the errors for approximation by the legs, results in $$E(s^n(a),t) \leq$$

$$\left(\frac{1}{4}\right)^n \left(\frac{|w_0|}{s^n(w)(t)} |a_0 - 2a_1 + a_2|t^2 + s^n(a)(t)\frac{2|w_0 - w_1|t^2}{s^n(w)(t)}\right)$$

For a hyperbola, $w_0 \leq w(t) \leq w_1$ for every t. Hence, the first term in the error poses no problems, since $$\frac{w_0}{s^n(w)(t)} \leq 1.$$

The second term, however, requires more analysis. Suppose that n is fixed and allow the meaning of s to vary. Recall that $s^n(w)$ denotes the function given by n subdivisions of w and at each subdivision, either the right or the left resultant curve may be chosen. For a hyperbola, it is clear that the choice which minimizes the absolute values of $s^n(w)$ is to choose the segment which contains one of the endpoints. Suppose the endpoint corresponding to $t=0$ is chosen. (The argument for $t=1$ is similar) Look at the quantity $$\frac{|w_0 - w_1|t^2}{s^n(w)(t)}$$

for this segment. In particular its maximum value is to be found. A calculation shows that this quantity has nonnegative first derivatives at all points. Hence it will attain its maximum value for the maximum allowable value of t, namely $\frac{1}{2}$. This value is $$\frac{\frac{1}{4}|w_0 - w_1|}{\frac{w_0 + w_1}{2} + \frac{w_0 - w_1}{4^n}} = \frac{2 * 4^{(n-1)}\frac{w_1 - w_0}{w_1 + w_0}}{4^n - 2 * \frac{w_1 - w_0}{w_1 + w_0}}$$

So, $$E(s^n(a),t) \leq$$

-continued $$\left(\frac{1}{4}\right)^n \left(|a_0 - 2a_1 + a_2|t^2 + s^n(a)(t)\frac{4 * 4^{(n-1)}\frac{w_1 - w_0}{w_1 + w_0}}{4^n - 2 * \frac{w_1 - w_0}{w_1 + w_0}}\right)$$

So with rearrangement, $$E(s^n(a),t) \leq \left(\frac{1}{4^n - 2 * \frac{w_1 - w_0}{w_1 + w_0}}\right)\left(\frac{|a_0 - 2a_1 + a_2|}{4} + \max_t(a(t))\frac{w_1 - w_0}{w_1 + w_0}\right)$$

Requiring $E(s^n(a),t) < b$, it can be required $$n \geq$$

$$\log_4\left(\frac{|a_0 - 2a_1 + a_2| + 4\max(a(t))\frac{w_1 - w_0}{w_1 + w_0}}{4b} + 2\frac{w_1 - w_0}{w_1 + w_0}\right)$$

which is a precomputable depth given the curve and the error bound. Also, this is a bound on the depth to which the original error check will go since it represents a worst case for that check.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A computer graphics method for approximating a curve having beginning and end coordinates by a series of connected straight line segments, said method employing a recursive subdivision of said curve and control polygons, each control polygon having at least a first straight line segment extending between two coordinates on said curve and additional connecting line segments to create a closed plane figure, a maximum distance between said first straight line segment and said curve defined as an error value, said method comprising computer implemented the steps of:

a. establishing an error value threshold $\Delta_E$ between a said first straight line segment of a control polygon and said curve;
   b. establishing a control polygon whose first straight line segment has terminal vertices coincident with said curve's beginning and end coordinates, calculating an error value for said control polygon and testing said error value to determine if it exceeds $\Delta_E$ and if yes;
   c. modifying said calculated error value by a factor and testing said modified error value to determine if it is greater than $\Delta_E$, and if it is, again modifying said modified error value by said same factor, and repeating said test, said modifying action being repeated on a last modified value until a new modified value is equal to or less than $\Delta_E$;

d. establishing $2^n$ control polygons between said curve's beginning and end coordinates, where n equals the number of error values calculated in steps b and c;

e. creating an approximated curve by enabling joinder of said first straight line segments of each said $2^n$ control polygons; and f. displaying the approximated curve on a computer display, whereby a display delay time for the step of displaying is related to an execution time for the computer graphics method.

2. The method as recited in claim 1 wherein said curve is a cubic function and said error value in step b is m which is calculated using the expression:

$$m = 7\sqrt{2}\ \frac{\max(|x''(0)|,|x''(1)|,|y''(0)|,|y''(1)|)}{\Delta_E}$$

where: x'' and y'' are second derivatives of coordinate functions.

3. The method as recited in claim 2, wherein said modifying step includes a division of the calculated value of m by four.

4. The method as recited in claim 1 wherein said curve is a cubic function and said error value in step b is L which is calculated using the expression:

$$L = \log_4 \frac{7\sqrt{2}\ \max(|x''(0)|,|x''(1)|,|y''(0)|,|y''(1)|)}{\Delta_E}$$

where: x'' and y'' are second derivatives of coordinate functions.

5. The method as recited in claim 4 wherein said modifying step includes the subtraction of one from L.

6. The method as recited in claim 1, wherein said curve is a conic function, said method including the additional steps of:

identifying the curve type to be one of the group: hyperbola, ellipse;

if said curve is determined to be a hyperbola, calculating a said error value for said curve in step (b) as follows:

$$m_{hyperbola} = \max_{a = x,y} \frac{w_0|a_0 - 2a_1 + a_2| + 2|w_0 - w_1|\max_t(a(t))}{2(w_0 + w_1)\Delta_E}$$

if said curve is identified as an ellipse, calculating said error value for said curve in step (b) as follows:

$$m_{ellipse} = \max_{a = x,y} \frac{|a_0 - 2a_1 + a_2| + 4\max(a(t))\frac{w_1 - w_0}{w_1 + w_0}}{4\Delta_E} + 2\frac{w_1 - w_0}{w_1 + w_0}.$$

where: $w_0$, $w_1$ are curve weight values at curve coordinates 0 and 1, respectively; t=time; and $a_1$, $a_2$ are either coordinate values $x_1$, $x_2$ or $y_1$, $y_2$, as the case may be.

7. The method as recited in claim 6 wherein said modifying step includes a division of the calculated value of said error value by four.

8. The method as recited in claim 6 wherein said error value is calculated using the expression $L=\text{Log}_4(m)$.

9. The method as recited in claim 8 wherein said modifying step includes the reduction of the value of L by one.

10. The method of claim 6 wherein said conic curve has beginning and end coordinates x(0), y(0), w(0) and x(1), y(1), w(1), and wherein step (a) identifies the curve type by the expressions $w(1) > w(0) = \text{hyperbola}$ $w(1) < w(0) = \text{ellipse}.$ 11. A computer graphics incremental method for approximating a cubic curve, having beginning and end coordinates, by a series of connected straight line segments, said method predicting the number of steps required to achieve a desired error threshold $\Delta_E$ between the curve and a series of polygon line segments, wherein $\Delta_E$ is a maximum distance between said curve and a line segment connecting two coordinates on said curve, each said line segment forming a portion of a polygon, said method comprising computer implemented steps of:

a) computing $$L = \log_4\left(\frac{7\sqrt{2}\ \max(|x''(0)|,|x''(1)|,|y''(0)|,|y''(1)|)}{\Delta_E}\right)$$

b) choosing a step size $t = 2^{-L}$;

c) computing x(0), $x_t(0)$, $x_{tt}(0)$, $x_{ttt}(0)$ to a precision $\Delta_E 2^{-L}$;

d) computing y(0), $y_t(0)$, $y_{tt}(0)$, $y_{ttt}(0)$ to a precision $\Delta_E 2^{-L}$; and e) for (t=$\Delta$t to 1, by $\Delta$t increments) computing:

$x(t) = x(t-\Delta t) + x_t(t-\Delta t),$ $x_t(t) = x_t(t-\Delta t) + x_{tt}(t-\Delta t),$ $x_{tt}(t) = x_{tt}(t-\Delta t) + x_{ttt}(t-\Delta t),$ $y(t) = y(t-\Delta t) + y_t(t-\Delta t),$ $y_t(t) = y_t(t-\Delta t) + y_{tt}(t-\Delta t),$ $y_{tt}(t) = y_{tt}(t-\Delta t) + y_{ttt}(t-\Delta t),$ and drawing a line from x(t−$\Delta$t), y(t−$\Delta$t) to x(t), y(t) for each $\Delta$t increment to create an approximated curve where: L=number of curve subdivisions; t=time; x(0), y(0) are x and y coordinate functions at curve point t=0, etc.

$x(0) = x$ coordinate function at t=0, $x_t(0) = x_t(t_0 - \Delta t) - x(t_0),$ $x_{tt}(0) = x_t(t_0 + \Delta t) - x_t(t_0),$ $x_{ttt}(0) = x_{tt}(t_0 + \Delta t) - x_{tt}(t_0),$ $y(0) = y$ coordinate function at t=0, $y_t(0) = y_t(t_0 - \Delta t) - y(t_0),$ $y_{tt}(0) = y_t(t_0 + \Delta t) - y_t(t_0)$, $y_{ttt}(0) = y_{tt}(t_0 + \Delta t) - y_{tt}(t_0)$, and displaying the approximated curve on a computer display, whereby a display delay time for the step of displaying is related to an execution time for the computer graphics method.

12. A computer graphics incremental method for approximating an ellipse, having beginning and end coordinates, by a series of connected straight line segments, said method predicting the number of steps required to achieve a desired error threshold $\Delta_E$ between an ellipse and a series of line segments, wherein $\Delta_E$ is a maximum distance between said ellipse and a line segment connecting two coordinates on said ellipse, said method comprising computer implemented steps of:

a) computing $L = \log_4 (m_{ellipse})$ where $$\max_{a=x,y} \frac{|a_0 - 2a_1 + a_2| + 4\max(a(t))\frac{w_1 - w_0}{w_1 + w_0}}{4\Delta_E} + 2\frac{w_1 - w_0}{w_1 + w_0}$$

b) choosing a step size $\Delta t = 2^{-L}$
c) computing $X(0)$, $X_t(0)$, $X_{tt}(0)$ to a precision $\Delta_E 2^{-L}$;
d) computing $Y(0)$, $Y_t(0)$, $Y_{tt}(0)$ to a precision $\Delta_E 2^{-L}$;
e) computing $w(0)$, $w_t(0)$, $w_{tt}(0)$ to a precision $\Delta_E 2^{-L}$; and
f) for ($t = \Delta t$ to 1, by $\Delta t$ increments) computing $X(t) = X(t - \Delta t) + X_t(t - \Delta t)$, $X_t(t) = X_t(t - \Delta t) + X_{tt}(t - \Delta t)$, $Y(t) = Y(t - \Delta t) + Y_t(t - \Delta t)$, $Y_t(t) = Y_t(t - \Delta t) + Y_{tt}(t - \Delta t)$, $w(t) = w(t - \Delta t) + w_t(t - \Delta t)$, $w_t(t) = w_t(t - \Delta t) + w_{tt}(t - \Delta t)$, $x(t) = X(t)/w(t)$, $y(t) = Y(t)/w(t)$, and drawing a line from $x(t-\Delta t)$, $y(t-\Delta t)$ to $x(t)$, $y(t)$ for each $\Delta t$ increment to create an approximated curve
where: L = number of curve subdivisions;
$w_0$, $w_1$ are curve weight and values at curve coordinates 0 and 1, respectively;
t = time;
$a_1$, $a_2$ are either coordinate values $x_1$, $x_2$ or $y_1$, $y_2$, as the case may be;

$X(0) = X(0) w(0)$ (at $t=0$);

$X_t(0) = X(0)(t_0 + \Delta t) - X(0)(t_0)$;

$X_{tt}(0) = X_t(0)(t_0 + \Delta t) - X_t(0)(t_0)$;

$X_{ttt}(0) = X_{tt}(0)(t_0 + \Delta t) - X_t(0)(t_0)$;

$w(0)$ = weight of curve at $t=0$;

$w_t(0) = w(0)(t_0 + \Delta t) - w(0)(t_0)$;

$w_{tt}(0) = w_t(0)(t_0 + \Delta t) - w_t(0)(t_0)$; and displaying the approximated curve on a computer display, whereby a display delay time for the step of displaying is related to an execution time for the computer graphics method.

13. A computer graphics incremental method for approximating a hyperbola, having beginning and end coordinates, by a series of connected straight line segments, said method predicting the number of steps L required to achieve a desired error threshold $\Delta_E$ between an hyperbola and a series of line segments, wherein $\Delta_E$ is a maximum distance between said hyperbola and a line segment connecting two coordinates on said hyperbola, said method comprising computer implemented steps of:

a) computing $L = \log_4 (m_{hyperbola})$ where $m_{hyperbola} =$ $$\max_{a=x,y} \frac{w_0|a_0 - 2a_1 + a_2| + 2|w_0 - w_1|\max_t(a(t))}{2(w_0 + w_1)\Delta_E}$$

b) choosing a step size $\Delta t = 2^{-L}$
c) computing $X(0)$, $X_t(0)$, $X_{tt}(0)$ to a precision $\Delta_E 2^{-L}$;
d) computing $Y(0)$, $Y_t(0)$, $Y_{tt}(0)$ to a precision $\Delta_E 2^{-L}$;
e) computing $w(0)$, $w_t(0)$, $w_{tt}(0)$ to a precision $\Delta_E 2^{-L}$; and
f) for ($t = \Delta t$ to 1, by $\Delta t$ increments) computing $X(t) = X(t - \Delta t) + X_t(t - \Delta t)$, $x_t(t) = X_t(t - \Delta t) + X_{tt}(t - \Delta t)$, $Y(t) = Y(t - \Delta t) + y_t(t - \Delta t)$, $y_t(t) = y_t(t - \Delta t) + y_{tt}(t - \Delta t)$, $w(t) = w(t - \Delta t) + w_t(t - \Delta t)$, $w_t(t) = w_t(t - \Delta t) + w_{tt}(t - \Delta t)$, $x(t) = X(t)/w(t)$, $y(t) = Y(t)/w(t)$, and drawing a line from $x(t-\Delta t)$, $y(t-\Delta t)$ to $x(t)$, $y(t)$ for each $\Delta t$ increment to create an approximated curve
where: L = number of curve subdivisions;
$w_0$, $w_1$ are curve weight and values at curve coordinates 0 and 1, respectively;
t = time;
$a_1$, $a_2$ are either coordinate values $x_1$, $x_2$ or $y_1$, $y_2$, as the case may be;

$X(0) = X(0) w(0)$ (at $t=0$);

$X_t(0) = X(0)(t + \Delta t) - X(0)(t_0)$;

$X_{tt}(0) = x_t(0)(t_0 + \Delta t) - X_t(0)(t_0)$;

$X_{ttt}(0) = X_{tt}(0)(t_0 + \Delta t) - X_{tt}(0)(t_0)$;

$w(0)$ = weight of curve at $t=0$;

$w_t(0) = w(0)(t_0 + \Delta t) - w(0)(t_0)$;

$w_{tt}(0) = w_t(0)(t_0 + \Delta t) - w_t(0)(t_0)$; and displaying the approximated curve on a computer display, whereby a display delay time for the step of displaying is related to an execution time for the computer graphics method.

14. A computer graphics system for approximating a curve having beginning and end coordinates by a series of connected straight line segments, said system employing a recursive subdivision procedure for said curve and control polygons to accomplish subdivision of said curve, each control polygon having at least a first straight line segment extending between two coordinates on said curve and additional connecting line segments to create a closed plane figure, a maximum distance between said first straight line segment and said curve defined as an error value, said system including a stored error value threshold $\Delta_E$, said system comprising:

means for establishing a control polygon whose first straight line segment has terminal vertices coincident with beginning and end coordinates of said curve;

means for calculating an error value for said control polygon and testing said error value to determine if it exceeds $\Delta_E$ and if yes, modifying said error value that was calculated by a factor and testing said modified error value to determine if said modified error value is greater than $\Delta_E$, and if yes, again modifying said modified error value by said same factor and repeating said testing, said modifying being repeated on a last modified value by said means for calculating until a new modified value is equal to or less than $\Delta_E$;

means for establishing $2^n$ control polygons between said beginning and end coordinates of said curve, where n equals a number of error values calculated by said means for calculating; and means for creating an approximated curve by joining said first straight line segments of each of said $2^n$ control polygons and displaying the approximated curve.

* * * * *

UNITED STATES PATENT AND TRADEMARK OFFICE
CERTIFICATE OF CORRECTION

PATENT NO. : 5,408,598
DATED : Apr. 18, 1995
INVENTOR(S) : Pryor, Jr.

It is certified that error appears in the above-indentified patent and that said Letters Patent is hereby corrected as shown below:

In column 24, line 69, the expression reads "$y_t(0)=y_t(t_0-\Delta t)-y(t_0),$".
It should read --$y_t(0)=y(t_0-\Delta t)-y(t_0),$--.

In column 25, line 20, before the expression insert --$m_{ellipse}=$--.

In column 25, after line 62, insert the expression
--$X_{ttt}(0)=X_{tt}(0)(t_0+\Delta t)-X_{tt}(0)(t_0)$--.

In column 26, line 54, the expression reads "$X_t(0)=X(0)(t+\Delta t)-X(0)(t_0)$".
It should read --$X_t(0)=X(0)(t_0+\Delta t)-X(0)(t_0)$--.

Signed and Sealed this

Eighteenth Day of July, 1995

BRUCE LEHMAN

*Attest:*

*Attesting Officer*  *Commissioner of Patents and Trademarks*